US012492578B2

(12) United States Patent
Wehr et al.

(10) Patent No.: US 12,492,578 B2
(45) Date of Patent: Dec. 9, 2025

(54) ELECTROMECHANICAL LOCK

(71) Applicant: ABUS August Bremicker Söhne KG, Wetter-Volmarstein (DE)

(72) Inventors: Michel Wehr, Willingen (DE); Bernd Weiershausen, Rehe (DE)

(73) Assignee: ABUS August Bremicker Söhne KG, Wetter-Volmarstein (DE)

( * ) Notice: Subject to any disclaimer, the term of this patent is extended or adjusted under 35 U.S.C. 154(b) by 387 days.

(21) Appl. No.: 17/895,172

(22) Filed: Aug. 25, 2022

(65) Prior Publication Data

US 2023/0064198 A1 Mar. 2, 2023

(30) Foreign Application Priority Data

Aug. 27, 2021 (DE) ..................... 10 2021 122 247.8

(51) Int. Cl.
*E05B 47/00* (2006.01)

(52) U.S. Cl.
CPC .. *E05B 47/0012* (2013.01); *E05B 2047/0017* (2013.01); *E05B 2047/0025* (2013.01); (Continued)

(58) Field of Classification Search
CPC ........ E05B 67/14; E05B 67/22; E05B 67/063; E05B 2047/0024; E05B 2047/0025; E05B 2047/0036; E05B 17/2007; E05B 47/0012
See application file for complete search history.

(56) References Cited

U.S. PATENT DOCUMENTS 8,540,291 B2 9/2013 Bliding et al.
2010/0283575 A1* 11/2010 Tubb ....................... E05B 67/22 70/52

(Continued)

FOREIGN PATENT DOCUMENTS

CN 110984725 A * 4/2020 ......... E05B 47/0603
DE 19638188 A1 3/1998

(Continued)

OTHER PUBLICATIONS

Espacenet machine translation of CN 110984725 A, generated Apr. 29, 2025. (Year: 2025).*

(Continued)

*Primary Examiner* — Kristina R Fulton
*Assistant Examiner* — Emily G. Brown
(74) *Attorney, Agent, or Firm* — Dickinson Wright PLLC

(57) ABSTRACT

An electromechanical lock includes an electromechanical locking mechanism and a control circuit, wherein an associated counter-piece is locked by way of the locking mechanism. The locking mechanism has a latch, an entrainer that is rotatable about an axis of rotation for driving the latch, and an electric motor for driving the entrainer, wherein the latch is moveable between a locking position and an unlocking position, wherein the latch is preloaded in the direction of the locking position. The entrainer is rotatable into a release position, a standby position, and a blocking position and the latch can is driven to perform a movement into the unlocking position by rotating the entrainer into the release position. In the standby position, the latch is released to be urged back against the preload. In the blocking position, the entrainer blocks the latch against a movement in the direction of the unlocking position.

17 Claims, 15 Drawing Sheets

(52) U.S. Cl.
CPC ................. *E05B 2047/0036* (2013.01); *E05B 2047/0067* (2013.01)

(56) References Cited

U.S. PATENT DOCUMENTS

| | | | | |
|---|---|---|---|---|
| 2016/0298359 | A1* | 10/2016 | Kim | E05C 3/042 |
| 2019/0003206 | A1 | 1/2019 | Sanford et al. | |
| 2019/0344849 | A1* | 11/2019 | Weiershausen | E05B 17/2084 |
| 2020/0102772 | A1* | 4/2020 | Ishiguro | E05B 79/04 |
| 2021/0047865 | A1* | 2/2021 | Tsui | E05B 67/22 |

FOREIGN PATENT DOCUMENTS

| | | | | |
|---|---|---|---|---|
| DE | 19639235 | A1 | 3/1998 | |
| DE | 60004754 | T2 | 7/2004 | |
| DE | 102006024685 | A1 | 2/2007 | |
| DE | 102015119187 | A1 | 5/2017 | |
| DE | 102016119570 | A1 | 4/2018 | |
| DE | 102018111296 | A1 | 11/2019 | |
| DE | 102018111305 | A1 | 11/2019 | |
| DE | 102018116434 | A1 | 1/2020 | |
| DE | 102019123481 | A1 | 3/2021 | |
| EP | 1760230 | A2 | 3/2007 | |
| FR | 3042897 | A1 * | 4/2017 | E05B 71/00 |

OTHER PUBLICATIONS

Espacenet machine translation of FR 3042897 A1, generated Apr. 5, 2025. (Year: 2025).*

* cited by examiner

C

ELECTROMECHANICAL LOCK

CROSS-REFERENCE TO RELATED APPLICATIONS

This application claims the benefit of previously filed German Patent Application No. DE 10 2021 122 247.8, filed Aug. 27, 2021, the entire content of which is hereby incorporated by reference in its entirety.

FIELD

The invention relates to an electromechanical lock comprising an electromechanical locking mechanism for locking an associated counter-piece that adopts an open position or a closed position relative to the locking mechanism. The electromechanical locking mechanism has a latch, an entrainer that is rotatable about an axis of rotation for driving the latch, and an electric motor for driving the entrainer, wherein the latch may be moved between a locking position, in which the latch locks the associated counter-piece located in the closed position, and an unlocking position, in which the latch releases the associated counter-piece for the open position. Furthermore, the latch is preloaded in the direction of the locking position.

BACKGROUND

A preload of the latch in the direction of the locking position may in particular make it possible to provide an automatic function for automatically locking an associated counter-piece. For this purpose, the latch may, for example, be movable against the preload into the unlocking position by transferring the associated counter-piece from the open position into the closed position, in order, however, to automatically snap back into the locking position when the associated counter-piece is brought into the closed position. The latch may, for example, consequently enter into engagement with a notch formed at the associated counter-piece in order to lock the associated counter-piece and to block it against a movement into the open position.

Such an automatic function may enable a convenient handling of the lock by so-to-say keeping the latch ready in the locking position such that a user only has to bring the associated counter-piece into the closed position and does not have to perform any other actions—for instance the actuation of a key—in order to achieve a locking. So that an authorized user may, however, selectively open the lock, the entrainer may be configured to intentionally drive the latch into the unlocking position on a corresponding command and thereby to release the counter-piece for the open position or for a transfer into the open position. With respect to purely mechanical locks, electromechanical locking mechanisms may also simplify the opening process in that, for example, a key likewise does not have to be necessary for this purpose.

While such a lock thus enables a handling that is convenient for a user, there is generally the problem with locks having an automatic function for an automatic locking of an associated counter-piece that the latch has to be released for a movement into the unlocking position to be able to be moved against the preload by the counter-piece during the transfer into the closed position. However, this requirement is accompanied by the risk that an unauthorized person may potentially succeed in moving the latch into the unlocking position even without an actuation of the electric motor or the entrainer when the associated counter-piece is located in the closed position. Such locks may in particular be susceptible with respect to the so-called hammer blow method in which an attempt is made to move the latch by a short blow against the preload into the unlocking position and to bring the associated counter-piece into the open position at that moment at which the latch reaches the unlocking position.

Therefore, there is a need for electromechanical locks comprising an automatic function that have an increased security against break-open attempts.

SUMMARY

Accordingly, it is an object of the invention to provide an electromechanical lock that provides an automatic function for automatically locking an associated counter-piece as a result of a transfer of the counter-piece relative to the locking mechanism of the lock from an open position into a closed position and that enables a reliable locking of the counter-piece in the closed position with respect to break-open attempts.

This object is satisfied by an electromechanical lock having the features of claim 1 and, in particular, wherein the entrainer may be selectively rotated into a release position, a standby position, and a blocking position by way of the electric motor. By rotating the entrainer into the release position, the latch may be driven by way of the entrainer to perform a movement from the locking position into the unlocking position. In the standby position of the entrainer, the latch is released to be urged back against the preload from the locking position. In the blocking position of the entrainer, the entrainer, in contrast, blocks the latch against a movement from the locking position in the direction of the unlocking position. Furthermore, the lock has a control circuit that is configured to control the electric motor to drive the entrainer into the release position, the standby position, and the blocking position.

By driving the entrainer into the standby position, the automatic function already mentioned may in particular be provided wherein, in the standby position, the latch may be driven from the locking position into the unlocking position by the associated counter-piece during its transfer from the open position into the closed position to be able to automatically lock the associated counter-piece when reaching the closed position. While the associated counter-piece may be provided to urge the latch against the preload into the unlocking position by the transfer from the open position into the closed position, the latch and the associated counter-piece may in particular be coordinated with one another such that the associated counter-piece may not move the latch from the locking position into the unlocking position by a force directed in the direction of the open position. Therefore, the associated counter-piece may be locked as soon as the counter-piece adopts the closed position and the latch moves into the locking position such that no separate action of a user or an actuation of the entrainer has to be required for the locking of the associated counter-piece brought into the closed position. For example, the associated counter-piece may for this purpose have a notch or a receiver into which the latch engages due to the preload into the locking position when the associated counter-piece is located in the closed position. The preload of the latch may in particular be generated by a spring.

To bring the associated counter-piece from the open position into the closed position, the counter-piece may in particular be movable relative to the locking mechanism between the open position and the closed position. The counter-piece may therefore, in particular during such a movement relative to the locking mechanism, urge the latch from the locking position into the unlocking position when the entrainer is located in the standby position. For this purpose, provision may be made that a user of the lock moves the associated counter-piece from the open position into the closed position (in a rest system of the user) while the lock and/or the locking mechanism remains/remain unmoved. Alternatively thereto, it is, however, also possible that the locking mechanism is moved by a user during the use of the lock in order to bring the associated counter-piece relative to the locking mechanism into the open position or into the closed position while the counter-piece may remain unmoved. Furthermore, both the associated counter-piece and the locking mechanism may be movable, in particular simultaneously and/or towards one another, in order to bring the counter-piece from the open position into the closed position. Provision may likewise be made that the associated counter-piece may be moved relative to the locking mechanism to transfer the associated counter-piece from the closed position into the open position.

While the associated counter-piece may thus be brought from the open position into the closed position in the standby position of the entrainer and may be automatically locked when reaching the closed position, the latch may be intentionally moved from the locking position into the unlocking position wherein the electric motor is controlled by way of the control circuit to drive the entrainer into the release position. This enables the authorized user to open the lock and to selectively transfer the associated counter-piece into the open position. For example, provision may be made that a user may transmit a predetermined unlocking command to the control circuit to cause the control circuit to control the electric motor and to drive the entrainer into the release position such that only the authorized user may open the lock. For example, an unlocking command may be transmitted by entering a code at an input device provided for this purpose at the lock or, if applicable, via a radio connection, for instance a Bluetooth connection, by way of a mobile radio device.

Due to the standby position of the entrainer, the lock thus provides a convenient automatic function for automatically locking the associated counter-piece directly as a result of a transfer of the associated counter-piece into the closed position and said lock may be actuated by way of the electric motor in a simple manner and, for example, without a mechanical key in order to selectively release the associated counter-piece for a movement into the open position again.

In addition, the security of the electromechanical lock against unauthorized opening attempts may, however, be further increased by the blocking position of the entrainer wherein a movement of the latch in the direction of the unlocking position may be blocked by driving the entrainer into the blocking position. While a movement of the latch into the unlocking position has to be possible in the standby position to be able to realize the desired automatic function, the latch is secured in the blocking position of the entrainer against a movement into the unlocking position such that the latch may be movable from the locking position into the unlocking position solely by transferring the entrainer into the release position. A movement of the latch into the unlocking position in the course of a break-open attempt, without actuating the entrainer or the electric motor, may thus be reliably prevented. The entrainer and the electric motor may furthermore be protected from external access, for example, by a housing of the lock or generally an installation environment into which the lock, and in particular the locking mechanism, is inserted. The blocking position of the entrainer may in particular provide increased protection with respect to the hammer blow method explained in the introduction because the latch is secured against a movement into the unlocking position by driving the entrainer into the blocking position and a movement into the unlocking position may thus be prevented by an external force that is, for example, applied by a blow to a housing of the lock.

For example, provision may be made to drive or to set the entrainer into the standby position when the associated counter-piece adopts the open position relative to the locking mechanism such that the automatic function for automatically locking the associated counter-piece is available for a user and the latch may first be moved into the unlocking position by transferring the associated counter-piece into the closed position in order thereupon to snap into the locking position again and to lock the associated counter-piece. The entrainer may thereupon be driven into the blocking position to achieve a complete securing of the associated counter-piece. This driving of the entrainer into the blocking position may, for example, take place automatically after the associated counter-piece has been brought into the closed position, for which purpose a corresponding sensor system may be provided. Alternatively thereto, provision may also be made that, once the associated counter-piece has adopted the closed position, a user may transmit a separate command to the control circuit to selectively drive the entrainer into the blocking position. For example, a button or a switch may for this purpose be provided at an outer side of the lock or of an installation environment for the lock or such a command may be transmittable to the control circuit via a radio connection.

While the associated counter-piece is located in the closed position, the entrainer may be held in the blocking position to secure the latch in the locking position. When the control circuit thereupon receives an unlocking command, the entrainer may be driven into the release position by way of the electric motor such that the user may bring the associated counter-piece into the open position. Provision may in particular furthermore be made to drive the entrainer into the standby position again as soon as the associated counter-piece adopts the open position relative to the locking mechanism in order so-to-say to transfer the lock into the starting state again in which the automatic function is available. The movement of the entrainer into the standby position may also take place automatically or by a separate command of a user, if applicable, again via a button or a switch at an outer side of the lock or of an installation environment for the lock or via a radio connection.

To block the latch in the blocking position against a movement into the unlocking position, the latch may, for example, be directly blocked by a contact to the entrainer. For example, the entrainer may engage behind the latch and/or a contact section of the latch in the blocking position such that movements of the latch in the direction of the unlocking position may be directly restricted by the entrainer and a movement into the unlocking position may be blocked. Alternatively thereto, provision may, however, also be made that the entrainer is configured to move a blocking element during a rotation into the blocking position, said blocking element blocking the latch against a movement into the unlocking position when reaching the blocking position of the entrainer and, for example, engaging behind the latch in the blocking position of the entrainer.

The electromechanical locking mechanism may, as already mentioned, generally be inserted into an installation environment in order, for example, to be able to selectively block or release access to spaces or access to objects by locking the associated counter-piece. However, the lock may in particular have a lock body that includes the electromechanical locking mechanism and/or the control circuit. For example, such a lock body may comprise a housing in which the electromechanical locking mechanism is inserted and by which the electromechanical locking mechanism is protected from external access. Such a lock comprising a lock body may further have a securing part, for instance a lock hoop, that forms the associated counter-piece such that the electromechanical lock and the associated counter-piece may form a common unit in some embodiments. In such locks, the locking mechanism or the lock body and the associated counter-piece or the securing part may in particular be movable towards one another in order to bring the counter-piece relative to the locking mechanism from the open position into the closed position.

The electromechanical lock may further, for example, be directly integrated into a door in which a door leaf movable relative to a door frame may be selectively lockable to the door frame by way of the lock. The electromechanical lock and/or the electromechanical locking mechanism may for this purpose in particular be directly installed into the door frame or the door leaf. Accordingly, the associated counter-piece may be formed by that part of the door frame and the door leaf or may be arranged at that part which does not comprise the lock.

The electromechanical lock may furthermore, for example, be integrated into a container that may be closed by way of a cover or a flap, wherein the electromechanical lock and/or the electromechanical locking mechanism may, for example, be installed into a storage section of the container, which may be closed by way of the cover or the flap and into which objects or documents may be inserted, or into the cover or the flap. The associated counter-piece may accordingly be formed by or arranged at the respective other part of the storage section and of the cover or the flap.

For example, in the case of an electromechanical lock integrated in a container or into a door environment, provision may be made that the lock is installed into a respective movable part of the container or of the door environment, i.e., for example, a cover, a flap or a door leaf, such that the associated counter-piece may be formed by or attached to a part that is ultimately stationary during the use, for example, a storage section of the container or a door frame. Alternatively thereto, the lock may, however, also be inserted into the stationary part of such installation environments to be able to selectively lock a counter-piece, which is moved during the use, in the closed position or to release it for a movement into the open position.

The electromechanical lock may in particular further be a mobile and/or portable lock that may be reproduced as a padlock, for example. Such a padlock may have a securing part and a lock body to which the securing part may be selectively lockable as an associated counter-piece. For example, such securing parts may be configured as rigid or flexible hoops that may be at least partly released from the lock body in the open position and that may be introducible into the lock body, in particular into an introduction opening formed at the lock body, for a transfer into the closed position. A hoop may in particular be rigid and substantially U-shaped, wherein such a U hoop may be completely separated from the lock body in the open position or may have a long limb and a short limb, wherein the long limb may be held in the lock body in the open position while the short limb may be released from the lock body and may in particular be pivotable about the long limb. Alternatively thereto, a padlock may, for example, be configured as a rope lock or a chain lock that may have a flexible rope or a flexible chain as a securing part, wherein a bolt that may be locked to the lock body may be formed at at least one end of the hoop.

For example, the electromechanical lock may be used as a padlock to block access to spaces in that, for example, a U hoop is guided through an eyelet of a hasp and is locked to the lock body. Furthermore, the electromechanical lock may in particular be a two-wheeler lock or be used as a two-wheeler lock, for which purpose the lock may, for example, be configured as a hoop lock, in particular a U hoop lock, a folding lock, a brake disc lock, or a frame lock.

A brake disc lock may, for example, be used to secure a two-wheeler, in particular a motorcycle, in that a securing part (as an associated counter-piece) of the brake disc lock is guided through an opening of a brake disc of the parked two-wheeler and the lock is connected to the brake disc. A brake disc lock, which may generally be further developed as an electromechanical lock of the type described herein, is, for example, described in DE 10 2018 111 305 A1 such that the contents of this patent application are explicitly included in the present disclosure with respect to the general mode of operation and design of a brake disc lock.

A folding lock may, as a securing part or an associated counter-piece, in particular have a jointed bar hoop, which has a plurality of jointed bars pivotable relative to one another, and a lock body, wherein one end of the jointed bar hoop may be releasable from the lock body and may have a locking bar that may be selectively introduced into the lock body and locked there. Such a jointed bar hoop may, for example, be used to be guided around a section of a two-wheeler, for example a frame section, and a stationary object, for example a bicycle stand or a lamppost, such that the jointed bar hoop may form a closed loop with the lock body after the introduction of the locking bar and may securely connect the two-wheeler to the stationary object. For example, an electromechanical folding lock or joint lock is known from DE 10 2019 123 481 A1, wherein a locking mechanism of the type described herein having a preloaded latch may also be used in such a folding lock. Therefore, the contents of this document are also explicitly included in the present disclosure with respect to the general design and mode of operation of a folding lock.

Furthermore, the electromechanical lock may, for example, also be designed as a battery lock to be able to automatically lock a battery to a vehicle and to be able to unlock said battery by an electrical control such as is known from DE 10 2016 119 570 A1 and DE 10 2018 111 296 A1. For example, the battery itself or a flap of a battery compartment into which the battery may be inserted may be provided as an associated counter-piece in such locks.

The electromechanical lock may further be arranged at a portable object that may be removed from its fastening environment in the unlocked state such as is known from DE 10 2015 119 187 A1. In the case of such locks, the associated counter-piece may also generally remain unmoved during the intended use in order ultimately to achieve a relative movement between the counter-piece and the locking mechanism by a movement of the lock or of the electromechanical locking mechanism and to bring the counter-piece into the open position or the closed position.

As mentioned, the electromechanical lock may also serve for an automatic locking of doors (e.g. of buildings, furniture, or vehicles) or of flaps or covers (e.g. of containers). A lock generally suitable for this purpose is known from DE 10 2006 024 685 A1.

The contents of these documents are also explicitly included in the disclosure of the present application with respect to the possible design and mode of operation of the electromechanical lock.

Furthermore, DE 196 39 235 A1 generally describes a lock having an automatic function for locking a locking bolt in a lock body, wherein the latch may be linearly moved between the locking position and the unlocking position. The contents of this document are also explicitly included in the present disclosure with respect to an automatic locking of an associated counter-piece by a latch preloaded in the direction of a locking position.

Further embodiments are described in the following.

In some embodiments, the latch may have a drive section that is configured to be impacted by the entrainer in order to drive the latch into the unlocking position and the latch may have a blocking section that is configured to lock the associated counter-piece, which is located in the closed position, in the locking position of the latch. The drive section and the blocking section may be formed at a common latch element or at separate latch elements.

The latch may thus generally be formed in one part or in multiple parts. The drive section of the latch may be in contact with the entrainer and/or may at least sectionally contact the entrainer to be able to be impacted by the entrainer, while the blocking section may be in engagement with the associated counter-piece in the closed position of the associated counter-piece in order to lock the associated counter-piece. In the blocking position of the entrainer, the drive section may in particular be blocked against a movement by which the latch may be moved into the unlocking position and the blocking section may be brought out of engagement with the associated counter-piece. For example, the drive section may for this purpose be engaged behind by the entrainer in the blocking position of the entrainer.

The movement of the latch between the unlocking position and the locking position may be a linear movement in some embodiments, while in other embodiments the latch may be movable by a pivot movement between the unlocking position and the locking position. Alternatively thereto, the latch may also be rotatable between the unlocking position and the locking position.

The aforementioned blocking section may in particular perform a linear movement or a pivot movement or a rotational movement to selectively lock the associated counter-piece located in the closed position or to be able to release it for the open position, in particular for a movement into the open position. The corresponding movement may be transmittable to the blocking section via the drive section, wherein, in a multi-part design of the latch, it is also possible that the blocking section is movable relative to the drive section while the latch is moved from the locking position into the unlocking position or vice versa. For example, as a result of a movement of the entrainer from the standby position into the release position, a drive section linearly movable by the entrainer may actuate a pivot lever at which the blocking section is arranged such that the blocking section may be brought into or out of engagement with the associated counter-piece by a pivot movement. In a single-part design of the latch, the drive section and the blocking section may, in contrast, perform a common and/or rigidly coupled movement when the latch is moved between the locking position and the unlocking position.

In some embodiments, the latch may be configured to block the associated counter-piece in the closed position in the locking position when the entrainer is rotated into the standby position. In some embodiments, in the standby position of the entrainer, the latch may be released to first be urged back from the locking position by way of the associated counter-piece when the latter is brought from the open position into the closed position, and then to snap back into the locking position as a result of the preload.

The latch and the associated counter-piece may in particular cooperate such that the latch may be moved into the unlocking position by transferring the associated counter-piece relative to the locking mechanism from the open position into the closed position, wherein the latch may not be movable into the unlocking position by a force applied in the direction of the open position to the associated counter-piece located in the closed position. For example, the latch and/or the associated counter-piece may for this purpose have a displacement slope that urges the latch into the unlocking position during a relative movement of the associated counter-piece to the locking mechanism into the closed position, whereas the latch and the associated counter-piece may have respective surfaces that are oriented perpendicular to a direction of a relative movement between the associated counter-piece and the locking mechanism from the closed position into the open position and that contact one another in the closed position of the associated counter-piece and the locking position of the latch to secure the associated counter-piece against a transfer into the open position. Such a surface may, for example, be formed at a notch of the associated counter-piece and/or the associated counter-piece may have a receiver into which the latch engages in the locking position when the associated counter-piece is located in the closed position.

In some embodiments, the entrainer may be configured to hold the latch in the unlocking position in the release position.

In some embodiments, the entrainer may have a blocking section that forms an abutment for the latch in the blocking position. The latch may in particular contact the blocking section in the blocking position.

The movement of the latch in the direction of the unlocking position may be blocked by the blocking section of the entrainer such that the entrainer may be directly provided for blocking the latch without actuating a further element. For this purpose, the blocking section of the entrainer may be able to be brought into alignment with a section of the latch, for example, by rotating the entrainer into the blocking position such that the latch or the section of the latch abuts the blocking section on a movement of the latch in the direction of the unlocking position and prevents the reaching of the unlocking position. For this purpose, the blocking section may in particular be spaced apart from a control cam of the entrainer which may be provided at the entrainer for a transition from the standby position into the release position and by which the latch may be contacted for driving into the unlocking position in order to engage behind the latch in the blocking position.

In some embodiments, the entrainer may further have a guiding section which is opposite the blocking section and which the latch contacts in the blocking position. Such a guiding section may in particular form a part of a control cam via which the latch may be movable from the locking position into the unlocking position by rotating the entrainer from the blocking position into the release position. Because, in the blocking position of the entrainer, the latch may thus contact the guiding section, on the one hand, and an abutment for the latch may be provided opposite the guiding section by the blocking section, on the other hand, the latch may be engaged around at two sides in the blocking position and/or may be held in a fixed manner in the locking position. The guiding section and the blocking section may in particular furthermore bound a receiver into which the latch and/or a contact section of the latch, which contacts the guiding section, may be introduced by rotating the entrainer into the blocking position, wherein the guiding section may be connected to the blocking section by a further boundary of the receiver.

In general, the latch may have a contact section that may be directly impacted by the entrainer to move the latch between the unlocking position and the locking position. Such a contact section may thus in particular contact a control cam formed by the entrainer and/or may be blocked in the blocking position by a blocking section formed at the entrainer. The contact section may for this purpose in particular be formed as an extension or an elevated portion at the latch which is directly in contact with the entrainer and via which a drive may be transmitted to the latch.

In some embodiments, the release position, the standby position, and the blocking position of the entrainer may differ from one another with respect to their angular positions. Alternatively thereto, in other embodiments, the release position and the blocking position may correspond to the same angular position of the entrainer and may differ from one another with respect to the direction of rotation in which the entrainer has to be rotated in order, starting from the standby position, to set either the release position or the blocking position.

The standby position may define a zero position of the entrainer with respect to which the release position and the blocking position of the entrainer and their angular positions may be defined. A clear sequence of angular positions may thereby, for example, be determined during the use of the electromechanical lock such that the entrainer may be held in the standby position when the associated counter-piece is located in the open position and may be moved into the blocking position by a defined change of the angular position after a transfer of the associated counter-piece into the closed position. To release the associated counter-piece, the entrainer may be driven by a likewise clearly defined movement about a specific angle from the blocking position into the release position and, if necessary, into the standby position again.

For example, provision may be made that the entrainer and/or the electric motor may be rotated solely along a single direction of rotation and that the release position, the standby position, and the blocking position of the entrainer differ from one another with regard to their angular positions with respect to this direction of rotation. In such embodiments, the release position, the standby position, and the blocking position may, for example, be oriented offset from one another by 120° in each case such that the entrainer may always be rotated by the same angle to control the sequence of the standby position, the blocking position, the release position, and the standby position again that is desired when the lock is used. This may enable a simple control of the entrainer in that the electric motor may generate the same rotational movement of the entrainer on each control without having to check in which position the entrainer is located.

In embodiments in which the release position and the blocking position correspond to the same angular position of the entrainer with respect to the standby position, but differ from one another with respect to the direction of rotation, the entrainer may, in contrast, be rotatable along two opposite directions of rotation by way of the electric motor. Because the angular positions of the blocking position and the release position correspond to one another, the entrainer, starting from the standby position, may, for example, be rotated along one direction of rotation into the blocking position in order thereupon to be able to be moved by a rotation about 360° along the opposite direction of rotation into the release position. Due to a rotation about the same angle by which the entrainer was rotated about the one direction of rotation from the standby position into the blocking position, but along the opposite direction of rotation, the entrainer may thereupon be rotated into the standby position again. This may also enable a simple control of the entrainer, wherein only a complete rotation about 360° and two rotations about the same angle, but in mutually opposite directions of rotation have to be controlled.

In some embodiments, the entrainer may be rotatable from the standby position into the blocking position by a rotation about less than 120°. The entrainer may in particular be rotatable from the standby position into the blocking position by a rotation about less than 90° and/or by a rotation between 5° and 60° and/or a rotation between 10° and 30°.

Thus, after the transfer of the associated counter-piece relative to the locking mechanism into the closed position, only a slight rotation of the entrainer may be required to move the entrainer into the blocking position. The position of the entrainer may so-to-say be only slightly corrected after the transfer of the associated counter-piece into the closed position in order to secure the latch in the locking position.

In some embodiments, the entrainer, starting from the standby position, may be transferable into the standby position again by a complete rotation about the axis of rotation. The entrainer may in particular be transferrable from the standby position into the standby position again by a single rotation of the entrainer about the axis of rotation, i.e. by a rotation about 360°.

In some embodiments, the entrainer may form a continuous control cam between an angular section which the latch contacts in the standby position of the entrainer and an angular section which the latch contacts in the release position of the entrainer. During a rotation of the entrainer from the standby position into the release position, the latch may thereby be guided via a continuous control cam and may be moved into the unlocking position without this control cam having a step between the standby position and the release position with respect to the direction of rotation in which the entrainer is rotated to move from the standby position into the release position. The latch may thereby be smoothly and continuously guided against the preload into the unlocking position during the rotation of the entrainer.

In some embodiments, the entrainer may, in contrast, have a step between the release position and the standby position, via which step the latch may be guided during a rotation of the entrainer from the release position into the standby position. Due to the preload of the latch into the locking position, the latch may, however, be urged against the control cam such that, after passing the step, the latch may automatically again come into contact with the control cam that is continuous between the standby position and the release position. The control cam may in particular be formed by a radially outwardly disposed margin of the entrainer, wherein the entrainer may be configured as a cam disc, for example. Alternatively thereto, the control cam may, for example, be formed by a thread to be able to drive a latch, which is linearly movable between the locking position and the unlocking position, by a rotation of the entrainer.

In some embodiments, the entrainer may be rotatable along a first rotational direction from the standby position into the release position and the entrainer may be rotatable along a second rotational direction from the standby position into the blocking position. The second direction of rotation may be opposite the first direction of rotation.

In such embodiments, the entrainer may furthermore be rotatable along the first direction of rotation from the blocking position via the standby position into the release position. Starting from the standby position, the latch and/or a contact section of the latch may in particular come into alignment and/or into contact with a blocking section, by which a movement of the latch into the unlocking position is blocked, by a rotation along the second direction of rotation, while the latch, starting from the blocking position or the standby position, may be guided by a rotation along the first direction of rotation, in particular along a continuous control cam, to move into the unlocking position in the release position of the entrainer.

Alternatively thereto, in some embodiments, the entrainer may be rotatable starting from the standby position via the blocking position into the release position. In such embodiments, a blocking section spaced apart from a control cam may, for example, be provided that, by rotating the entrainer from the standby position into the blocking position, may be able to be brought into alignment with the latch and/or a contact section of the latch in order to block the latch. As soon as the associated counter-piece adopts the closed position relative to the locking mechanism, the entrainer may thus be driven along a defined direction of rotation into the blocking position to bring the blocking section into alignment with the latch. In response to an unlocking command, the entrainer may thereupon be rotated further along the direction of rotation into the release position, wherein, after a transfer of the associated counter-piece relative to the locking mechanism into the open position, the entrainer may again be brought back into the standby position by a rotation along the direction of rotation in order to enable a further transfer of the associated counter-piece into the closed position and an automatic locking of the associated counter-piece. In such embodiments, the entrainer may in particular be driven by a rotation about 360° from the standby position into the standby position again, wherein, during such a rotation about 360°, the entrainer may successively pass through the blocking position and the release position, starting from the standby position.

In some embodiments, the lock may have a preload spring that is configured to preload the associated counter-piece, which is located in the closed position, in the direction of the open position. Due to such a preload spring, the associated counter-piece may be automatically urged and/or moved in the direction of the open position when reaching the release position of the entrainer in which the latch is moved into the unlocking position. The entrainer may thereby, for example, be continuously rotated beyond the release position into the standby position again, wherein the latch may be held in the unlocking position by the associated counter-piece that is already moved in the direction of open position relative to the locking mechanism due to the preload spring so that a user may completely transfer the associated counter-piece into the open position relative to the locking mechanism. If or even before the associated counter-piece reaches the open position and releases the latch, the latch may snap back into the locking position again due to the preload to be available for the automatic function. Alternatively thereto, the associated counter-piece may also completely move into the open position relative to the locking mechanism due to the preload of the preload spring when the latch is moved into the unlocking position. Thus, in some embodiments, it is not necessary for the entrainer to be stopped in the release position. However, irrespective of the presence of a preload spring for the associated counter-piece, provision may generally also be made that the entrainer is stopped in the release position to be able to intentionally transfer the associated counter-piece completely into the open position.

In some embodiments, the lock may have a sensor that is configured to detect the associated counter-piece in the closed position and to output a corresponding detection signal. Such a sensor may, for example, have a mechanical contact switch, an electromechanical contact switch, a capacitive proximity switch, a magnetic switch, an optoelectronic interruption switch, or an optoelectronic proximity switch.

The sensor may be configured, starting from the open position of the associated counter-piece relative to the locking mechanism and the standby position of the entrainer in which the latch is located due to its preload in the locking position, to directly or indirectly detect the associated counter-piece brought into the closed position relative to the locking mechanism. For example, the sensor may be directly contacted by the associated counter-piece on a transfer of the associated counter-piece from the open position into the closed position, for which purpose the sensor may be arranged in an environment or directly in a movement path of the associated counter-piece during a transfer from the open position into the closed position. Alternatively thereto, the sensor may, for example, indirectly detect the associated counter-piece in that the sensor detects the movement of the latch into the unlocking position or the reaching of the unlocking position. For this purpose, the sensor may accordingly be arranged in an environment or within a movement path of the latch during its movement from the locking position into the unlocking position. A sensor arranged in such a manner may furthermore make it possible to detect when the entrainer reaches the release position because the latch is also moved into the unlocking position in this case. Therefore, in some embodiments, the lock may comprise both a sensor that is configured for a direct detection of the associated counter-piece in the closed position and a further sensor that is configured for a detection of the latch in the unlocking position.

In some embodiments, the control circuit may be configured to control the electric motor to drive the entrainer into the blocking position in response to the detection signal. For this purpose, the control circuit, which may, for example, comprise a microprocessor and/or a CPU (Central Processing Unit), may be connected to the sensor.

The control circuit may in particular be configured to control the electric motor to drive the entrainer from the standby position into the blocking position in response to the detection signal. Due to such a sensor, an extended and complete automatic function for locking the associated counter-piece may thus be provided in that the associated counter-piece may first be automatically locked after a transfer relative to the locking mechanism from the open position into the closed position and the entrainer may thereupon be automatically rotated into the blocking position, in which the latch is secured against a movement into the unlocking position, in response to the detection signal. Therefore, a user only has to bring the associated counter-piece into the closed position, whereupon the locking of the associated counter-piece and the securing of the latch in the locking position may automatically take place without further actions of the user being necessary.

In some embodiments, the control circuit may further be configured to control the electric motor to drive the entrainer into the blocking position in response to the detection signal after a predefined waiting time.

For example, such a waiting time may amount to a few seconds, in particular one second, two seconds, or three seconds. Due to such a waiting period, it may be ensured that the associated counter-piece has been completely and correctly brought into the closed position and has remained in the closed position relative to the locking mechanism such that a user has completed the actuation of the lock. A driving of the entrainer into the blocking position when the associated counter-piece has again been moved out of the closed position relative to the locking mechanism may thereby be avoided in order in particular to prevent a blocking of the latch in the locking position when the associated counter-piece is located in the open position or an overloading of the motor on a rotation into the blocking position, but when the associated counter-piece blocks the latch in the direction of the locking position. The control circuit may in particular also be configured to move the entrainer into the blocking position only when the control circuit continues to receive a detection signal from the sensor after the predefined waiting time and the associated counter-piece is located in the closed position.

In some embodiments, the control circuit may be configured to control the electric motor to drive the entrainer into the release position in response to an unlocking command. The associated counter-piece may thereby in particular be released for the open position without an actuation of the lock by way of a key to be carried along being necessary.

In some embodiments, the control circuit may further be configured to control the electric motor to drive the entrainer into the standby position in response to the unlocking command after a predefined waiting time. The control circuit may in particular first control the electric motor to drive the entrainer into the release position in response to the unlocking command, whereupon the control circuit may control the electric motor to drive the entrainer into the standby position after a predefined waiting time.

Starting from the closed position of the associated counter-piece relative to the locking mechanism and the blocking position of the entrainer in which the latch is blocked in the locking position, the entrainer may thus first be rotated into the release position as a result of an unlocking command in order to drive the latch to perform a movement from the locking position into the unlocking position. This enables a user to transfer the associated counter-piece into the open position, in particular during the mentioned waiting time. After the waiting time, which may again amount to a few seconds, the entrainer may be rotated automatically and without a further or a separate command of the user into the standby position such that the latch indeed moves into the locking position again as a result of the preload, but the latch is released for an automatic locking of the associated counter-piece on a further transfer of the associated counter-piece into the closed position. If the associated counter-piece has, in contrast, not been brought into the open position during the waiting time, the entrainer may, if necessary, be automatically rotated into the blocking position after the movement into the standby position. This may in particular take place when the sensor already mentioned transmits a detection signal after the driving of the entrainer into the release position and into the standby position, said detection signal indicating that the associated counter-piece is located in the closed position.

In some embodiments, the lock may comprise a radio module that is configured for a wireless reception of the unlocking command. Alternatively or additionally, in some embodiments, the lock may have an input device for entering a code, wherein the control circuit may be configured to determine whether the code entered corresponds to the unlocking command.

The control circuit may also be configured to process an unlocking command received via a radio connection such that the unlocking command received via radio may, for example, likewise represent a code to be processed. The radio module may, for example, be configured to receive the unlocking command via a Bluetooth connection, a mobile radio connection, an NFC connection (near field communication), and/or a WLAN/WiFi connection. The unlocking command may, for example, be transmittable from a mobile radio device of a user, for instance from a smartphone, such that the control circuit may in particular be controllable by way of an app retrievable on the smartphone or a program retrievable on the smartphone.

Provision may be made that a user may intentionally transmit the unlocking command at a mobile radio device, for which purpose the user may, for example, press a button in an app, if applicable via a touch sensor or a touch display, or enter a code at the mobile radio device. Alternatively thereto, provision may also be made that the radio module is configured to automatically detect when a mobile radio device of a user is located in the vicinity of the lock and may thereupon transmit an unlocking command to the control circuit. Thus, in some embodiments, the lock may be automatically unlocked when the user moves into the vicinity of the lock and carries along the corresponding mobile radio device such that an automatic function may also be provided on the unlocking. To avoid an unwanted unlocking during such a function, the radio module may be configured to communicate with the mobile radio device via a radio connection having only a short range, for instance via a Bluetooth connection or an NFC connection, and/or the control circuit may be configured, after a movement of the entrainer into the blocking position, to enable an automatic unlocking only after a predefined waiting time.

A code to be entered may, for example, be a sequence of numbers that a user may enter via a touch sensor or one or more buttons at the lock. Alternatively or additionally, the lock may, for example, comprise an input device having a fingerprint sensor to be able to check a fingerprint and open the lock when the authorized user has been recognized. The input device may further comprise a display for displaying the code entered and/or for transmitting information in order, for example, to be able to indicate to the user whether an incorrect or a correct code has been entered.

In some embodiments, a rotor of the electric motor may be rotatable about the axis of rotation or about an axis in parallel with the axis of rotation.

In some embodiments, the electric motor may further be connected to the entrainer via a gear. Such a gear may in particular be a reduction gear unit such that a rotation of the electric motor or its rotor may be transmitted slowed down to the entrainer and the entrainer may accurately be selectively driven into the standby position, the release position, and the blocking position.

The electric motor and the entrainer may be arranged coaxially to one another in some embodiments. A gear for connecting the electric motor to the entrainer may also be arranged coaxially to the electric motor and the entrainer. Furthermore, the electric motor, the gear, and the entrainer may be arranged behind one another with respect to an axis of rotation of the electric motor or its rotor. Due to such an arrangement, the components for driving the latch may be oriented mainly along one direction such that the installation space occupied perpendicular to this direction may be minimized.

In some embodiments, the latch may be configured to move between the locking position and the unlocking position perpendicular to a direction along which the associated counter-piece and the electromechanical locking mechanism may be moved relative to one another in order to transfer the associated counter-piece into the open position or into the closed position. The latch may in particular be movable between the locking position and the unlocking position perpendicular to a direction along which the associated counter-piece may be moved between the closed position and the open position.

In the locking position, the latch may furthermore, in some embodiments, engage into a movement path of the associated counter-piece during a movement from the open position into the closed position, while the latch may release this movement path in the unlocking position. The movement of the latch between the locking position and the unlocking position perpendicular to the movement of the associated counter-piece between the closed position and the open position may moreover enable a reliable locking of the associated counter-piece because at most a small force may be transmittable to the latch in the direction of the unlocking position by a force applied to the associated counter-piece in the direction of the open position.

In some embodiments, the latch may be movable by a linear movement from the locking position into the unlocking position. In other embodiments, the latch may be movable by a pivot movement from the locking position into the unlocking position.

In some embodiments, the axis of rotation may be aligned in parallel with a direction along which the associated counter-piece may be moved relative to the electromechanical locking mechanism between the open position and the closed position. In other embodiments, the axis of rotation may, in contrast, be oriented perpendicular to the direction along which the associated counter-piece may be moved relative to the electromechanical locking mechanism between the open position and the closed position.

An axis of rotation aligned in parallel with the movement of the associated counter-piece relative to the electromechanical locking mechanism between the open position and the closed position may in particular make it possible to cause a pivotable latch to perform a pivot movement about a pivot axis perpendicular to the axis of rotation and thereby to move the latch from the locking position into the unlocking position. In contrast, an axis of rotation oriented perpendicular to the movement of the associated counter-piece relative to the electromechanical locking mechanism between the open position and the closed position may in particular make it possible to drive a latch, which is linearly movable along the axis of rotation, by way of the entrainer to perform a movement into the unlocking position and in particular to move said latch out of a movement path of the associated counter-piece in order to be able to move the associated counter-piece from the closed position into the open position. As already mentioned, the associated counter-piece, the electromechanical locking mechanism, or both the associated counter-piece and the electromechanical locking mechanism may generally be movable in a rest system of the user to move the associated counter-piece relative to the electromechanical locking mechanism between the open position and the closed position.

In some embodiments, the latch may have a pivot lever pivotable about a pivot axis and an engagement section that is fastened to the pivot lever and that locks the associated counter-piece, which is located in the closed position, in the locking position of the latch, wherein the latch may be movable by a pivot movement of the pivot lever about the pivot axis from the locking position into the unlocking position.

The engagement section may in particular be formed at the already mentioned blocking section of the latch or correspond to the blocking section and the pivot lever may comprise the drive section already mentioned. Furthermore, the likewise already mentioned contact section of the latch may be formed at the pivot lever such that the entrainer may, by acting on the contact section, drive the pivot lever to perform the pivot movement as a result of a rotation into the release position.

In some embodiments, the engagement section may be formed in one part with the pivot lever or may be formed by a latch element that is fastened to the pivot lever, but is originally produced separately. The engagement section may in particular extend perpendicular to the pivot lever and/or in parallel with the pivot axis and/or perpendicular to the axis of rotation of the entrainer. The engagement section may, for example, be formed by a pin-shaped, elongate latch element that may enter into engagement with a locking section of the associated counter-piece in the locking position in order thereby to block the associated counter-piece in the closed position.

In some embodiments, the entrainer may be configured as a cam disc which the pivot lever contacts, wherein the pivot lever may be drivable to perform the pivot movement by rotating the entrainer into the release position.

The cam disc may in particular have a control cam having a radial extent changing in the peripheral direction and/or an axial extent to be able to actuate the pivot lever during a rotation into the release position. The latch may in particular move into the unlocking position when a section of the cam disc having a maximum radial extent faces in the direction of the pivot lever. On a rotation of the cam disc beyond the release position, the pivot lever may be released for a movement opposite the pivot movement due to the decreasing radial extent such that the latch may move into the locking position again due to the preload. Between the release position and the standby position, the cam disc may have a continuously decreasing radial extent or a step may be formed which the latch passes due to the preload.

The pivot lever may be preloaded against the pivot movement in some embodiments. Due to this preload, the preload of the latch into the locking position may in particular also be generated such that the preload of the pivot lever against the pivot movement may correspond to the preload of the latch into the locking position.

The axis of rotation may be oriented perpendicular to the pivot axis in some embodiments. This may in particular make it possible to drive the pivot lever to perform the pivot movement by way of an entrainer that is configured as a cam disc and that has a radial extent varying in the peripheral direction.

In some embodiments, the pivot lever may have a contact section and the entrainer may have a blocking section, wherein the blocking section may engage behind the contact section in the blocking position and may block the pivot movement of the pivot lever by the engagement behind. In this respect, it may in particular be the blocking section already mentioned that forms an abutment for the latch. For this purpose, the blocking section may in particular be arranged radially spaced apart from a control cam of the entrainer with respect to the axis of rotation, via which control cam the latch is guided during a rotation of the entrainer from the standby position or the blocking position into the release position. Furthermore, in the blocking position of the entrainer, the contact section may contact a guiding section that forms a part of the control cam such that the contact section may be engaged around at two sides in the blocking position of the entrainer and may be stabilized at both sides with respect to movements about the pivot axis. The contact section may be formed by a section axially projecting from the pivot lever with respect to the axis of rotation of the entrainer such that the pivot lever may extend axially in alignment with the blocking section in the blocking position, but the pivot movement may be blocked by the contact section that is blocked by the blocking section in the radial direction with respect to the axis of rotation.

In some embodiments, in the blocking position, the entrainer may have a receiver for the contact section that is bounded at least at two sides, wherein the blocking section may form a first boundary of the receiver, and wherein a second boundary of the receiver that is opposite the first boundary may be formed by a guiding section which the contact section contacts.

In some embodiments, the latch may be movable by a linear movement along a latch axis from the locking position into the unlocking position and the entrainer may have a thread in which a contact section of the latch is guided during a rotation of the entrainer into the release position.

Due to such a thread, the rotational movement of the entrainer may in particular be transformed into the linear movement of the latch to be able to move the latch against the preload from the locking position into the unlocking position. The contact section of the latch may in particular project in a radially inwardly directed manner from the latch with respect to the axis of rotation of the entrainer to be able to be guided in a thread formed radially outwardly at the entrainer with respect to the axis of rotation. In such embodiments, the entrainer may in particular be configured in the manner of a screw, a threaded rod, or a worm and/or may comprise an element configured in such a manner. The latch axis may in particular be aligned in parallel with the axis of rotation of the entrainer or correspond to the axis of rotation.

In some embodiments, the entrainer may have a latch passage that extends along the latch axis and that connects a first end of the thread facing in the direction of the locking position of the latch to a second end of the thread facing in the direction of the unlocking position of the latch. In such embodiments, the contact section of the latch may be arranged in alignment with the latch passage in the standby position of the entrainer.

Because the contact section may be arranged in alignment with the latch passage in the standby position of the entrainer, the contact section and thus the latch may be released for a movement along the latch axis relative to the entrainer. This may make it possible to urge the latch into the unlocking position by transferring the associated counter-piece from the open position relative to the locking mechanism into the closed position, wherein the latch may snap back into the locking position due to the preload and the contact section guided in the latch passage when the associated counter-piece adopts and/or reaches the closed position. The latch may thus be guided in the latch passage via the contact section during the movement from the locking position into the unlocking position and the subsequent movement from the unlocking position into the locking position. Furthermore, during the movement of the latch from the locking position into the unlocking position, the contact section may be axially guided with respect to the latch axis from the first end of the thread to the second end of the thread in the latch passage.

During a rotation of the entrainer into the release position, the contact section may furthermore be moved in the thread from the first end to the second end such that the latch may be moved against the preload into the unlocking position. Due to a slight rotation beyond the release position, the contact section of the latch may thereupon again be brought into alignment with the latch passage connecting the two ends of the thread such that the latch may, due to the preload, move into the locking position again with the contact section guided through the latch passage. At the same time, in this position, the latch may again be urged back against the preload through the latch passage by the associated counter-piece, which is transferred into the closed position relative to the locking mechanism, such that the entrainer, starting from the release position, may also be transferred into the standby position by this slight rotation.

In some embodiments, the entrainer may further have a blocking section, wherein the contact section of the latch may be arranged in alignment with the blocking section in the blocking position of the entrainer, and wherein the blocking section may block a movement of the latch along the latch axis in the direction of the unlocking position. For this purpose, the blocking section may in particular have a blocking surface which is oriented perpendicular to the latch axis and which the contact section contacts in the blocking position of the entrainer. A force transmitted to the latch in the direction of the unlocking position may thus be led off to the entrainer to reliably hold the latch in the locking position. The blocking section may in particular adjoin the latch passage already mentioned.

In some embodiments, the contact section, starting from the standby position, may be introducible into the thread by a rotation of the entrainer along a first direction of rotation and the blocking section of the entrainer may be able to be brought into alignment with the contact section by a rotation along a second direction of rotation opposite the first direction of rotation. The first direction of rotation may in particular correspond to the already mentioned first direction of rotation for moving the entrainer from the standby position into the release position and the second direction of rotation may correspond to the already mentioned second direction of rotation for moving the entrainer from the standby position into the blocking position. The blocking section and the thread may further adjoin the already mentioned latch passage at mutually opposed sides. Alternatively thereto, provision may, however, also be made that the blocking section is formed by a part of the thread such that the entrainer may also in embodiments with a thread be rotatable along a direction of rotation from the standby position via the blocking position into the release position in order to linearly move the latch.

In some embodiments, the lock may have a lock body, which includes the locking mechanism, and the associated counter-piece, wherein the counter-piece may form a securing part that may be moved relative to the lock body between the open position and the closed position, wherein the latch may lock the securing part, which is located in the closed position, to the lock body in the locking position and may release the securing part in the unlocking position for a movement into the open position.

The lock and the associated counter-piece may thus so-to-say form a common unit that may in particular be selectively releasable from an object to be secured and/or locked. As already explained, such a lock may, for example, be configured as a hoop lock, a padlock, and/or a two-wheeler lock, wherein a two-wheeler lock may in particular be configured as a folding lock or a joint lock, a cable lock, a chain lock, a brake disc lock, or as a frame lock. A frame lock may in particular be fastened to a frame of a two-wheeler and may in this regard not be releasable from the two-wheeler during the use, but may represent a unit that may be selectively and/or subsequently connected to the frame.

In such embodiments, the lock body may further also comprise the control circuit. The lock body may furthermore comprise the sensors already mentioned above for detecting the associated counter-piece in the closed position and/or the latch in the unlocking position. A possibly provided sensor for detecting the latch in the locking position may also be arranged at or in the lock body. Furthermore, the radio module already mentioned for wirelessly receiving an unlocking command may be included by the lock body. The lock body may furthermore comprise a housing within which or at which the aforementioned components or a selection thereof may be arranged and by which in particular the locking mechanism may be protected from external access.

In some embodiments, the securing part and/or the latch may have a displacement slope via which the latch may be driven in the direction of the unlocking position during the movement of the securing part from the open position into the closed position. A direction of the movement of the latch between the locking position and the unlocking position may in particular be oriented transversely and/or perpendicular to a direction of the movement of the securing part between the open position and the closed position such that such a displacement slope may serve to derive the movement of the latch in the direction of the unlocking position from the movement of the securing part from the open position into the closed position and to enable a smooth force transmission to the latch. For this purpose, the latch and the securing part may, if necessary, also have a respective displacement slope, said displacement slopes cooperating with one another. For example, a displacement slope may be formed by a surface oriented obliquely to the respective direction of the movement of the securing part from the open position into the closed position or of the latch from the locking position into the unlocking position, wherein, alternatively thereto, the latch and/or the securing part may, however, also, for example, be formed sectionally rounded off to enable a smooth displacement of the latch against the preload.

In some embodiments, the electromechanical lock may be configured as a brake disc lock having a reception gap for a brake disc, wherein the securing part may be at least substantially L-shaped and may have an elongate securing section and an elongate connection section. The securing section may extend transversely to a direction of the movement of the securing part between the open position and the closed position and may have a free end, wherein the connection section may extend at least substantially in parallel with the direction of the movement of the securing part and may connect the securing section to the lock body. A locking section may further be formed at an end of the securing part that may be introduced into the lock body by the movement of the securing part into the closed position, wherein the securing section may bound the reception gap together with the lock body when the locking section is introduced into the lock body, and wherein the locking section may be lockable in the lock body by way of the latch. The electromechanical lock may thus in particular be configured similarly to the brake disc lock known from DE 10 2018 111 305 A1 whose basic design is referenced here.

In some embodiments, the electromechanical lock may further be configured as a joint lock and the securing part may be formed by a jointed bar hoop that has a plurality of jointed bars pivotably connected to one another, wherein a first end of the jointed bar hoop may be permanently fastened to the lock body and a second end of the jointed bar hoop may form a locking section. The locking section may be selectively introducible into the lock body or releasable from the lock body, wherein the locking section introduced into the lock body may be lockable in the lock body by way of the latch. The basic design of such a joint lock is, for example, described in DE 10 2019 123 481 A1 to which reference is likewise explicitly made.

In some embodiments, the electromechanical lock may be configured to lock a movable closure part relative to an installation environment, wherein the latch may be configured to engage into a latch receiver of the counter-piece in the locking position. In such embodiments, the electromechanical lock may be arranged at the movable closure part and the installation environment may form the associated counter-piece, wherein, alternatively thereto, the electromechanical lock may also be arranged at the installation environment and the movable closure part may form the counter-piece. The closure part may in particular comprise a cover, a flap, or a door leaf and the installation environment may in particular be formed by a container or a door frame.

For example, the lock may be part of a container in which objects or documents may be inserted. To insert the objects, the container may in particular at an upper side have an opening that may, however, be selectively closable by way of a cover or a flap, wherein the cover or the flap may be linearly movable or movable in a pivot movement relative to the container. Because an electromechanical lock of the type described herein may be integrated into such a container and the associated counter-piece may also be formed directly by the container or the cover or the flap, the respective closure part, a locking of the cover or the flap to the storage section may automatically take place when the container or its opening is closed.

In such embodiments, the associated counter-piece may in particular be formed by the cover or the flap or may be arranged thereat in order to be brought into the environment of a locking mechanism formed at the container as a result of a movement of the respective closure part into the closed position. For example, the associated counter-piece may for this purpose be configured as a bolt that projects away from the cover or the flap and that has a receiver for an engagement of the latch. Such a bolt may in particular come into contact with the latch during a movement of the closure part for closing the container and may urge the latch in the direction of the unlocking position, wherein the bolt may reach the closed position and the latch may snap into a receiver formed at the bolt as soon as the closure part closes, in particular completely closes, an opening of the container for inserting objects. In general, it is, however, also possible that the locking mechanism is installed into the cover or into the flap while the associated counter-piece and in particular a receiver for the latch may be formed at the container.

In some embodiments, the electromechanical lock may further be configured as a door lock and may be configured to selectively lock a door leaf, which is movable relative to a door frame, to the door frame or to release it for a removal from the door frame. In such door locks, the locking mechanism may also be installed into the door leaf, and thus into the closure part, or into the door frame, wherein the associated counter-piece may be formed by or at the respective other part of the door. For example, the door leaf may be displaceable or pivotable relative to the door frame to open or to close the door.

In some embodiments, the electromechanical lock may further be configured as a battery lock for a vehicle comprising an electrically operated drive motor and a battery unit for the energy supply of the drive, wherein the electromechanical lock may be configured to lock the battery unit to the vehicle. In such embodiments, the battery unit may form the counter-piece and the latch may be configured to engage into a latch receiver of the battery unit in the locking position.

An electromechanical lock configured as a battery lock may in particular be provided to secure a battery of an e-bike or a pedelec in order to prevent a theft or a release of the battery during travel. For example, the vehicle may have a battery compartment into which the battery may be inserted and into which the locking mechanism may be installed such that the battery and/or a prolongation of the battery provided for this purpose may contact the latch during an insertion of the battery into the battery compartment and may urge said latch into the unlocking position to be able to be locked by the latch, which snaps back into the locking position, on a complete insertion into the battery compartment and thus on a reaching of the closed position. Due to the automatic function of the battery lock, a user therefore only has to properly insert the battery into the battery compartment such that the locking of the battery may in particular not be forgotten.

Alternatively to a direct locking of the battery, in some embodiments, a battery compartment of a vehicle comprising an electrically powered drive motor may be closable by way of a flap when the battery is inserted, wherein the electromechanical lock may be configured to lock the flap to the battery compartment. This may ultimately take place in the same way as already above for an electromechanical lock integrated into a container. In such embodiments, a user thus only has to close the battery compartment by way of the provided flap, wherein a locking of the battery compartment may thereupon automatically take place to secure the battery against theft or a falling out during the travel with the vehicle.

The general design of such battery locks is, for example, described in DE 10 2016 119 570 A1 and DE 10 2018 111 296 A1, which are hereby incorporated by reference in their entirety.

BRIEF DESCRIPTION OF THE DRAWINGS

The invention will be explained in the following by way of example with reference to described embodiments and to the drawings, in which.

DETAILED DESCRIPTION

Figure 1A:
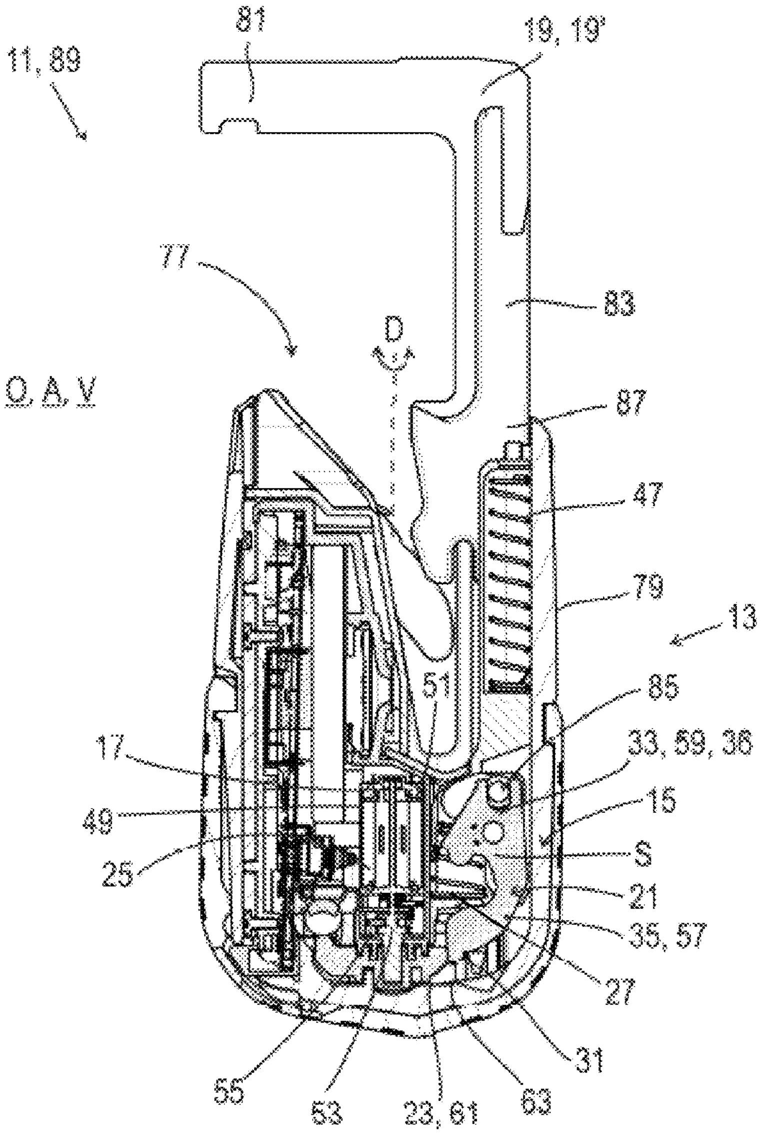
FIGS. 1A and 1B are a longitudinal sectional representation and a cross-sectional representation of a first embodiment of an electromechanical lock that is configured as a brake disc lock and that has, as an associated counter-piece, a securing part that adopts an open position or a closed position relative to an electromechanical locking mechanism of the brake disc lock and that may be locked in the closed position by way of the locking mechanism, wherein the locking mechanism has a latch pivotable between a locking position and an unlocking position and an entrainer for driving the latch, and wherein the securing part is located in the open position, the latch is located in the locking position, and the entrainer is located in a standby position.

FIGS. 1A to 4B show respective longitudinal sectional representations and respective cross-sectional representations of an electromechanical lock 11 that is configured as a brake disc lock 89. The electromechanical lock 11 comprises a lock body 13 and a securing part 19' that adopts an open position O, which is illustrated in FIGS. 1A and 4A, or a closed position G, which is illustrated in FIGS. 2A and 3A, relative to the lock body 13 or an electromechanical locking mechanism 15 included therein. The securing part 19' thus forms a counter-piece 19 associated with the electromechanical locking mechanism 15 or with the electromechanical lock 11, wherein the lock 11 and the counter-piece 19 or the securing part 19' so-to-say form a common unit in this embodiment of the electromechanical lock 11.

The securing part 19' is substantially L-shaped and has an elongate securing section 81 and an elongate connection section 83, wherein the connection section 83 connects the securing part 19' to the lock body 13. A free end of the securing section 81 may, in contrast, be removed from the lock body 13 to be able to be guided through an opening at a brake disc of a two-wheeler, in particular of a motorcycle, such that the brake disc may be arranged in a reception gap 77 of the brake disc lock 89. To transfer the securing part 19' from the open position O into the closed position G, the connection section 83 may be guided along its extent against the force of a preload spring 47 into the lock body 13. In the closed position G, the reception gap 77 is bounded by the lock body 13 and the securing section 81 of the securing part 19 (cf. FIGS. 2A and 3A) such that the brake disc lock 89 may be fixed to a brake disc by locking the securing part 19 and an unauthorized riding away with the two-wheeler may be prevented.

To be able to lock the securing part 19' to the lock body 13, the lock body 13 comprises the electromechanical locking mechanism 15. The locking mechanism 15 has a latch 21 and an entrainer 23 that may be rotated about an axis of rotation D by way of an electric motor 25 and that is configured to drive the latch 21. Due to the rotation of the entrainer 23, the latch 21 may be moved between a locking position V, in which the latch 21 locks the securing part 19' located in the closed position G to the lock body 13, and an unlocking position E in which the latch 21 releases the securing part 19' for a movement into the open position O (cf. FIGS. 1A to 4B). As can furthermore in particular be seen from FIG. 5A, the latch 21 is preloaded in the direction of the locking position V by way of a spring 27.

Figure 1B:
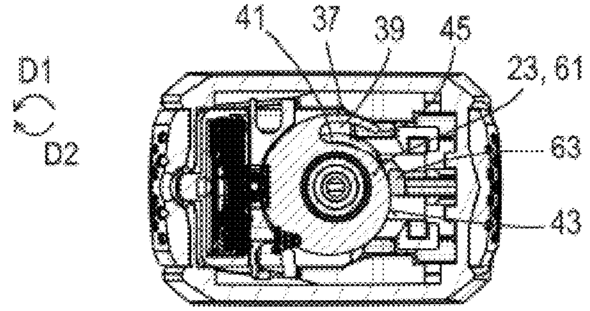

In FIG. 1A, the securing part 19' is shown in the open position O and the entrainer 23 is located in a standby position A (cf. also FIG. 1B). In this standby position A, the latch 21 is arranged in the locking position V due to the preload. However, in the standby position A of the entrainer 23, the latch 21 is released to first be driven to perform a movement from the locking position V into the unlocking position E, by way of the securing part 19 when the latter is moved from the open position O into the closed position G, and then to snap back into the locking position V as a result of the preload of the spring 27. This makes it possible to automatically lock the securing part 19' to the lock body 13 as a result of a movement into the closed position G without a user having to perform a further action for this purpose.

In the embodiment of the electromechanical lock 11 illustrated by way of FIGS. 1A to 5B, the latch comprises a pivot lever 57 which is pivotable about a pivot axis S, which forms a first latch element 35, and to which an engagement section 59 formed by a second latch element 36 is fastened. The pivot lever 57 thus forms a drive section 31 at which a contact section 63 is furthermore formed that is in direct contact with the entrainer 23 (cf. in particular FIG. 5A). For this purpose, the contact section 63 projects in the axial direction with respect to the axis of rotation D from the pivot lever 57.

The engagement section 59, in contrast, forms a blocking section 33 of the latch 21, wherein the drive section 31 and the blocking section 33 are here formed by two separate latch elements 35 and 36 that are rigidly fastened to one another, however. Alternatively thereto, an originally single-part latch 21 may also be provided (cf. also FIGS. 9A to 10B) or a multi-part latch may be provided in which the drive section and the blocking section or respective latch elements may be moved relative to one another.

As can be seen from FIG. 1A, the engagement section 59, which is pin-shaped and which extends in parallel with the pivot axis S (cf. FIGS. 5A and 5B), is arranged in the locking position V of the latch 21 in a path along which the securing part 19' is guided during a movement from the open position O into the closed position G. However, to be able to urge the latch 21 from the locking position V into the unlocking position E during the movement of the securing part 19 from the open position O into the closed position G, a displacement slope 29 is formed at the securing part 19' (cf. FIG. 5B). Via the displacement slope 29, a force may consequently be transmitted perpendicular to the direction of the movement of the securing part 19 to the engagement section 59, by which force the latch 21 or the pivot lever 57 may be driven to perform a pivot movement about the pivot axis S and the engagement section 59 may be moved out of the path described by the securing part 19'.

Figure 2A:
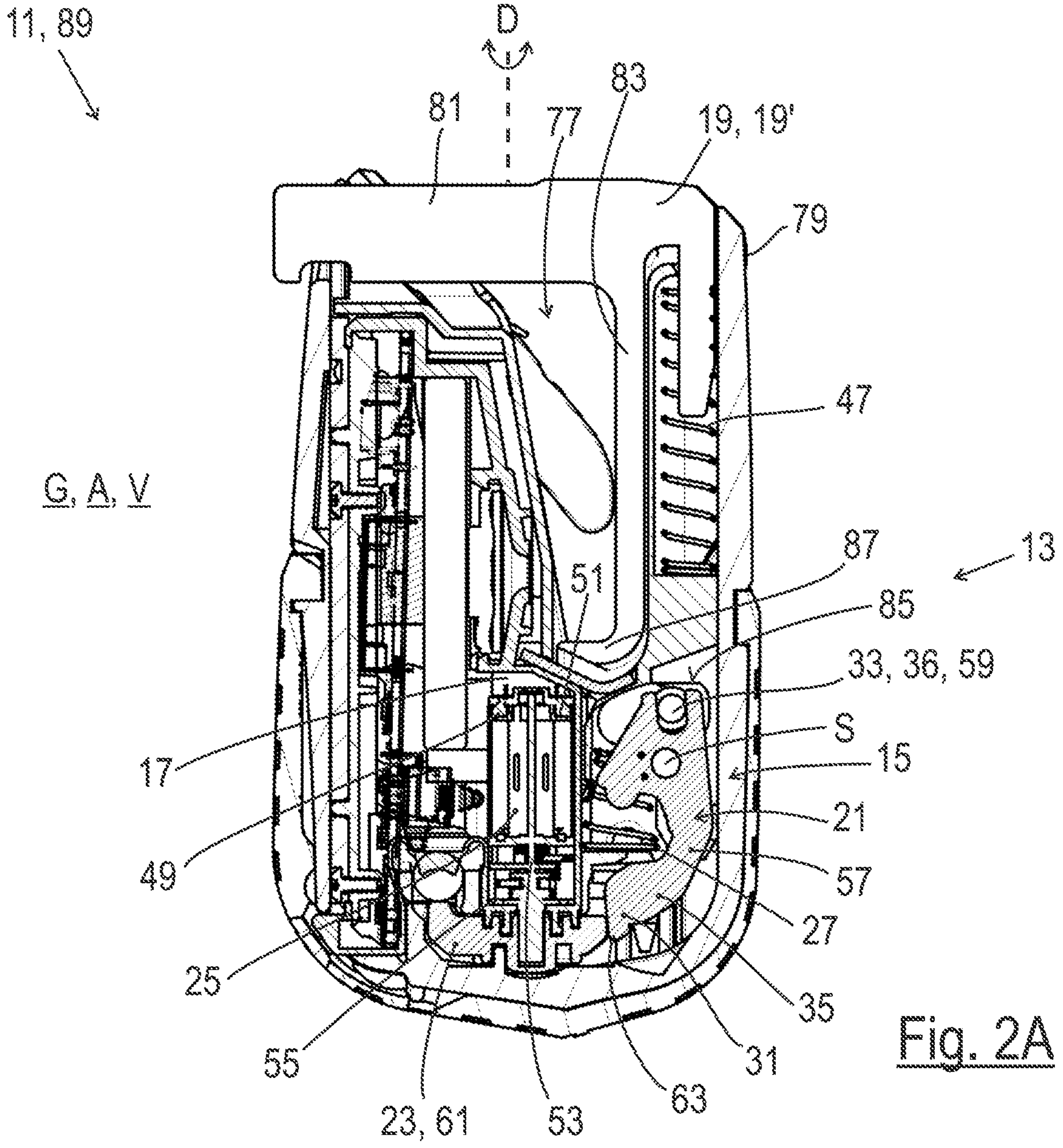
FIGS. 2A and 2B are a longitudinal sectional representation and a cross-sectional representation of the lock, wherein the securing part is located in the closed position, the entrainer is located in the standby position, and the latch is located in the locking position.
Figure 2B:
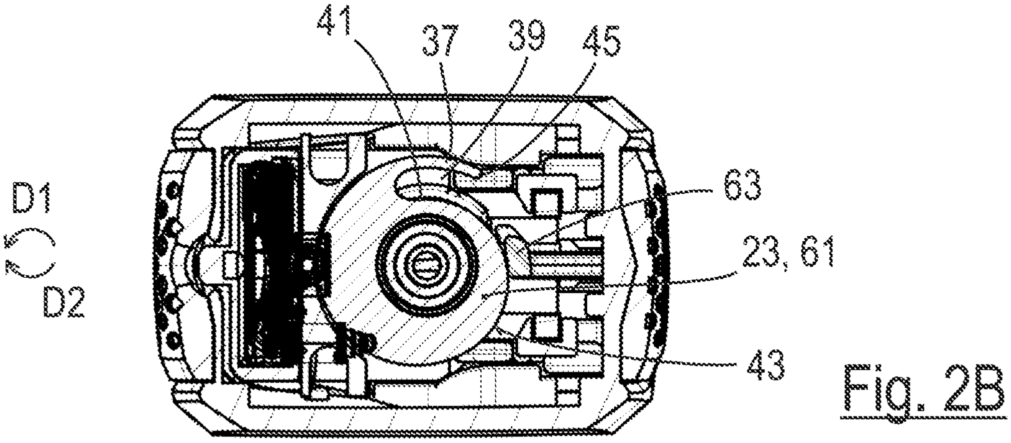
Figure 5A:
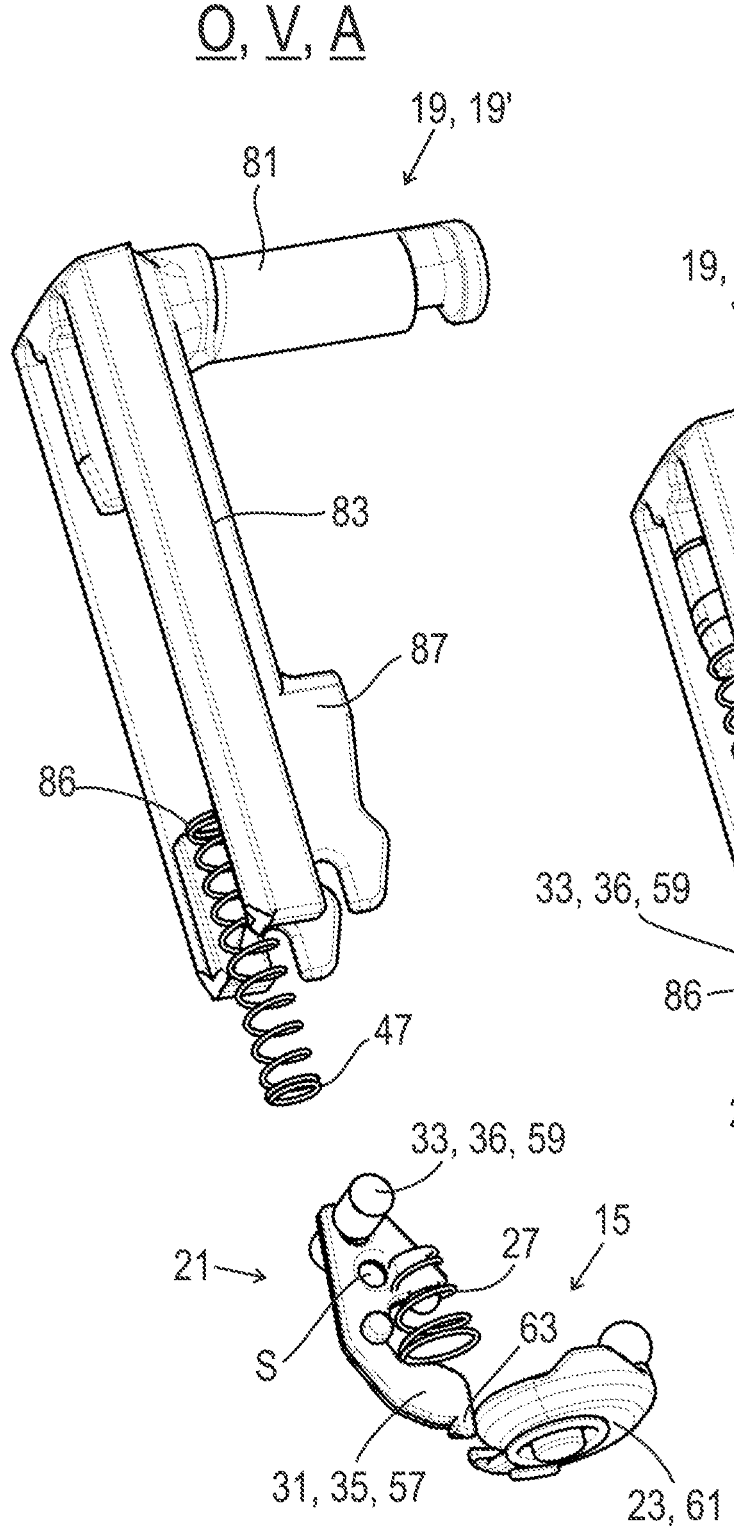
FIGS. 5A and 5B are a perspective representation of the locking mechanism and the securing part when the securing part is located in the open position and the entrainer is located in the standby position or when the securing part is located in the closed position and the entrainer is located in the blocking position.
Figure 5B:
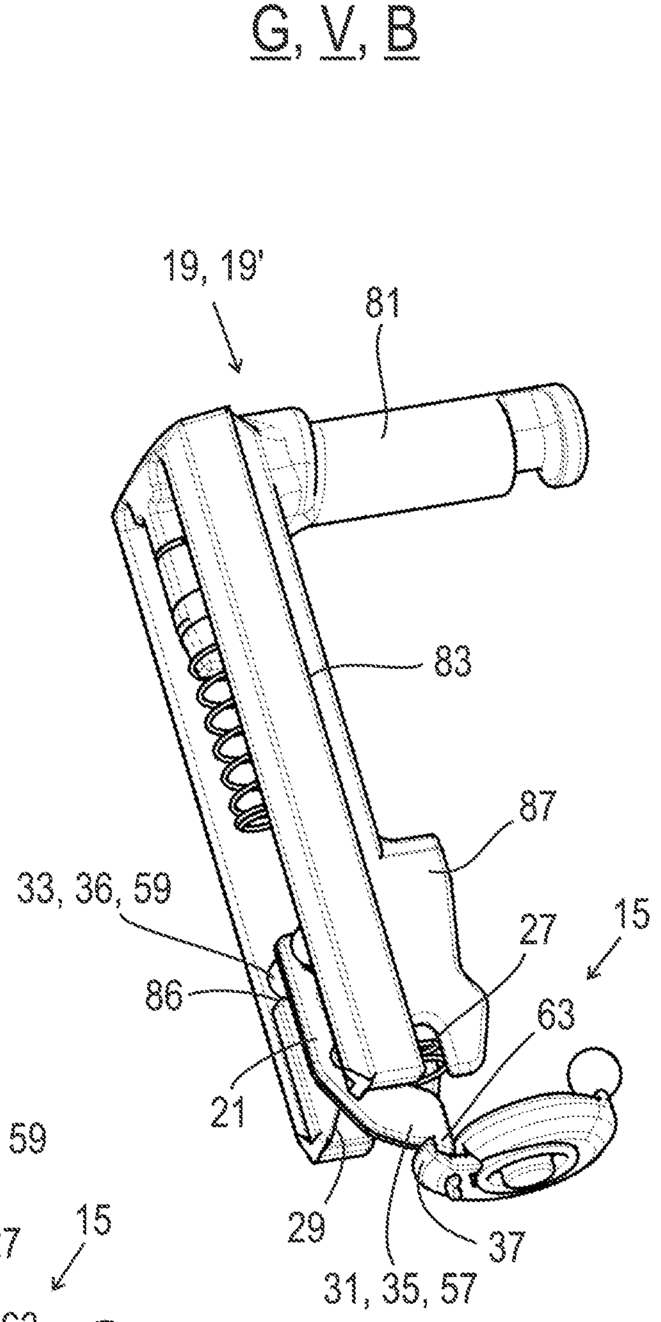

However, as soon as the securing part 19' reaches the closed position G, the latch 21 snaps back into the locking position V due to the preload by the spring 27 and engages over a locking surface 86 formed at the securing part 19' to secure the securing part 19' against a movement into the open position O (cf. FIGS. 2A and 5B). The locking surface 86 is formed at a locking section 87 of the securing part 19, wherein the engagement section 59 is guided via the displacement slope 29 between two limbs of the locking section 87 during the movement of the securing part 19 into the closed position G and pivots back and into alignment with the locking surface 86 when reaching the closed position G. As can, for example, be seen from FIG. 2A, in the locking position V, the engagement section 59 is further arranged in alignment with a housing section 85 formed by a housing 79 of the lock 11 such that a movement of the engagement section 59 in the direction of the open position O relative to the housing 79 is blocked and, due to the engagement between the engagement section 59 and the locking surface 86, the securing part 19' is also blocked against a movement into the open position O when the securing part 19' is located in the closed position G and the latch 21 is located in the locking position V.

The preload of the latch 21 into the locking position V thus makes it possible to provide an automatic function by which the securing part 19' may be locked to the lock body 13 directly by a movement from the open position O into the closed position G. While the securing part 19' is reliably secured in the closed position G by the latch 21, which is located in the locking position V, against a movement into the open position O by a force applied in the direction of the open position O, there is, however, the problem with such an automatic function that the latch 21 generally has to be released for a movement into the unlocking position E to be able to be displaced on a movement of the securing part 19 into the closed position G. However, from this, a possibility may in principle result of moving the latch 21 into the unlocking position E and moving the securing part 19' in an unauthorized manner into the open position O in the course of a break-open attempt. Locks having an automatic function may in particular prove to be susceptible with respect to the so-called hammer blow method in which an attempt is made to transmit a force counteracting the preload of the latch 21 to the latch 21 by a short blow to the housing 79 and to move the latch 21 briefly into the unlocking position E in order to exert a force onto the securing part 19' in the direction of the open position O at this very moment and to move the securing part 19' out of the closed position G.

Figure 3A:
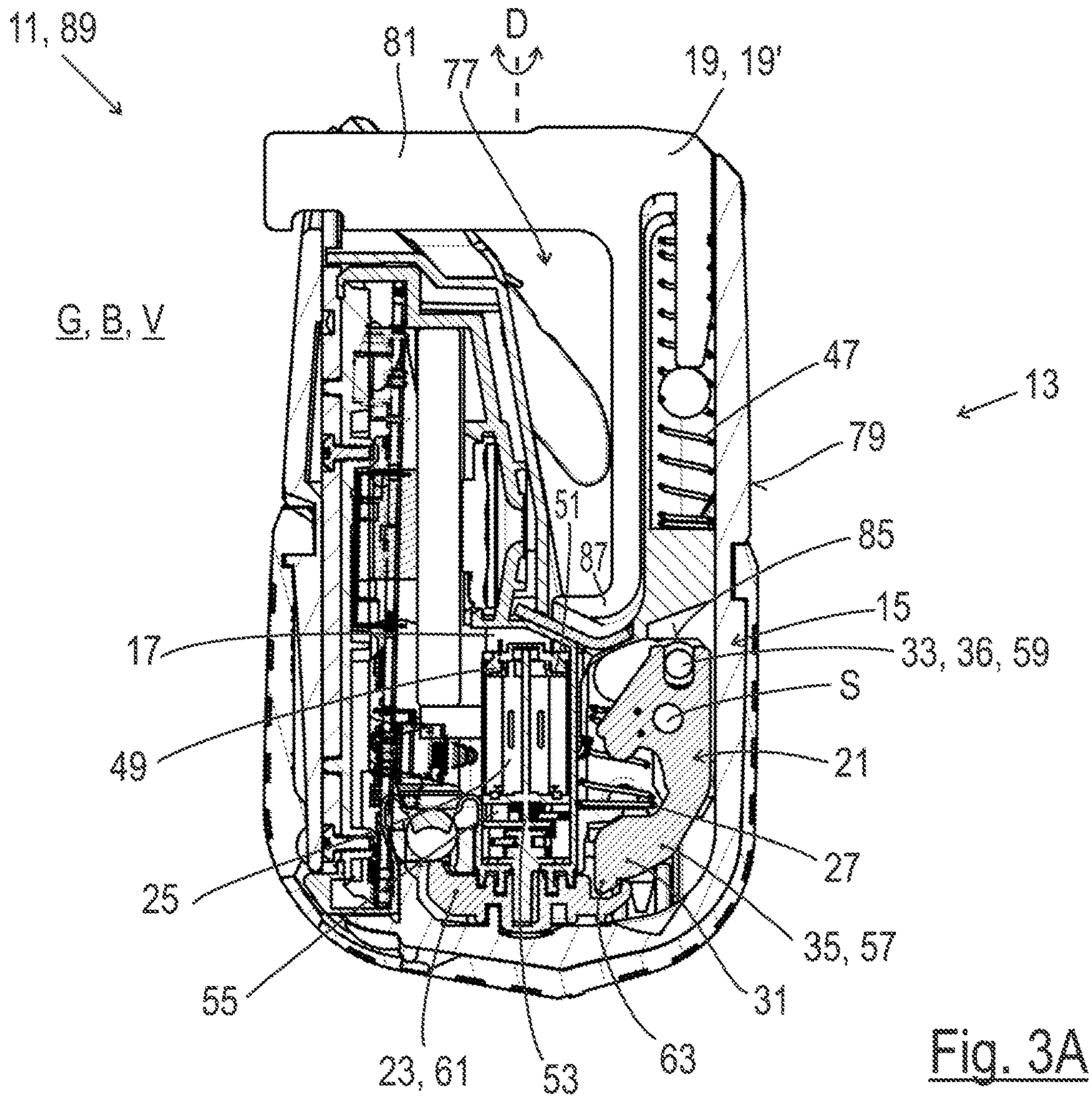
FIGS. 3A and 3B are a longitudinal sectional representation and a cross-sectional representation of the lock, wherein the securing part is located in the closed position, the entrainer is located in a blocking position, and the latch is located in the locking position.
Figure 3B:
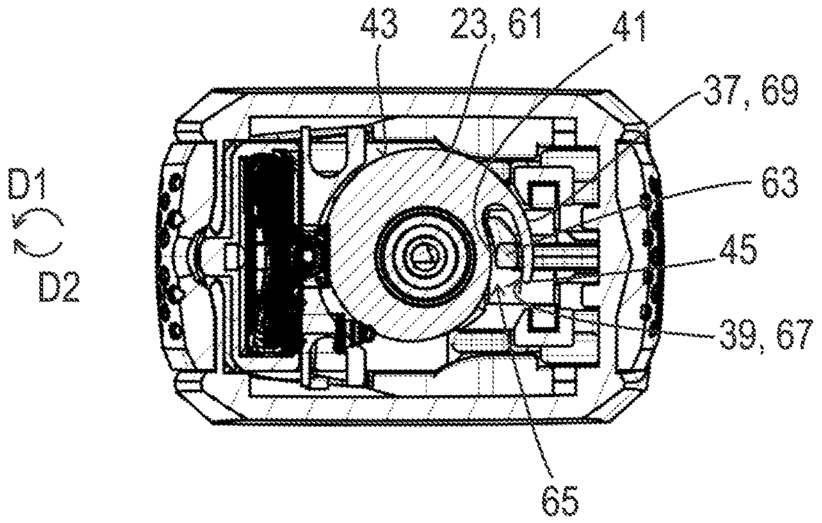

So that such break-open attempts may, however, be effectively prevented and the security of the lock 11 may be further increased, the entrainer 23 of the lock 11 may be rotated, starting from the standby position A, by way of an electric motor 25 into a blocking position B in which the latch 21 is blocked against a movement into the unlocking position E (cf. FIGS. 3A, 3B, and 5B). In the blocking position B of the entrainer 23, the contact section 63 of the latch 21 is arranged in alignment with a blocking section 37 of the entrainer 23 that forms an abutment 39 for the contact section 63 with respect to movements of the latch 21 in the direction of the unlocking position E and thereby prevents the pivot movement of the latch 21. In the blocking position B of the entrainer 23, the latch 21 is therefore blocked in the locking position V such that forces applied to the latch 21 in the direction of the unlocking position E, for example by way of a blow to the housing 79, are absorbed by the entrainer 23 and the latch 21 is reliably held in the locking position V.

Furthermore, in the blocking position B of the entrainer 23, the contact section 63 of the latch 21 contacts a guiding section 41 of the entrainer 23 that is opposite the blocking section 37. The contact section 63 is thus engaged around at two sides in the blocking position B of the entrainer 23 and the latch 21 is thereby stabilized in the locking position V, wherein the blocking section 37 forms a first boundary 67 and the guiding section 41 forms a second boundary 69 of a receiver 65 into which the contact section 63 is introduced in the blocking position B of the entrainer 23 (cf. FIGS. 3B and 6A).

Figure 4A:
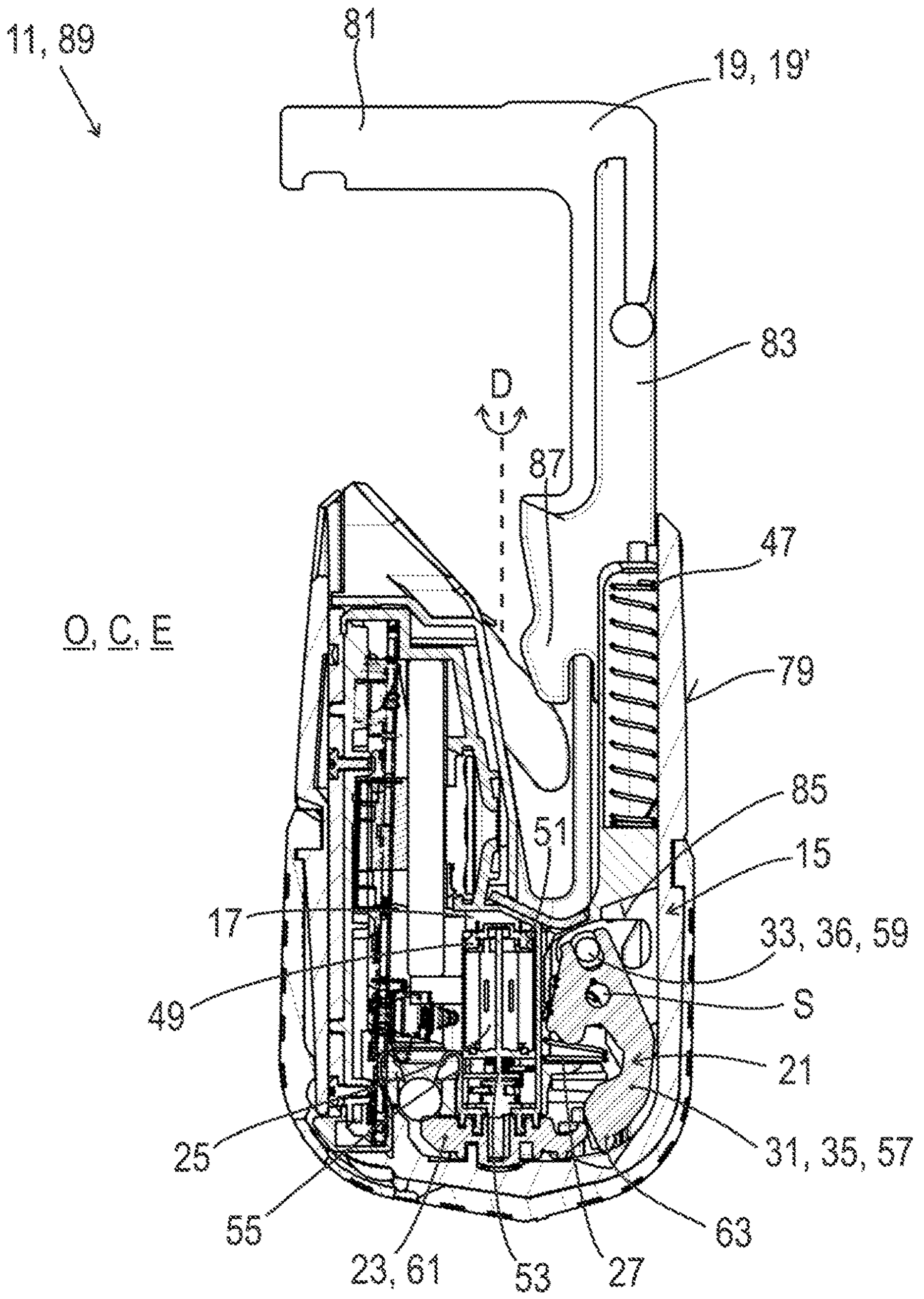
FIGS. 4A and 4B are a longitudinal sectional representation and a cross-sectional representation of the lock, wherein the securing part is located in the open position, the entrainer is located in a release position, and the latch is located in the unlocking position.

However, to be able to open the mechanical lock 11 and move the securing part 19' into the open position O again, the entrainer 23 may be rotated by way of the electric motor 25 from the blocking position B beyond the standby position A into a release position C, wherein the latch 21 may be driven to perform a movement from the locking position V into the unlocking position E by way of the entrainer 23 by rotating the entrainer 23 into the release position C (cf. in particular FIG. 4A). For this purpose, the entrainer 23 is configured as a cam disc 61 that has a control cam 43 that adjoins the guiding section 41 and that is formed by a margin of the entrainer 23 that is radially outwardly disposed with respect to the axis of rotation D. The entrainer 23 has a variable extent in the radial direction in the peripheral direction with respect to the axis of rotation D such that the pivot lever 57 may be driven to perform the pivot movement about the pivot axis S due to the contact between the contact section 63 and the control cam 43 when the entrainer 23 is rotated into the release position C. The control cam 43 is further continuously formed between the blocking position B and the release position C such that the contact section 63 may be continuously guided along the radially outer margin of the entrainer 23 during the rotation of the entrainer 23 into the release position.

Figure 4B:
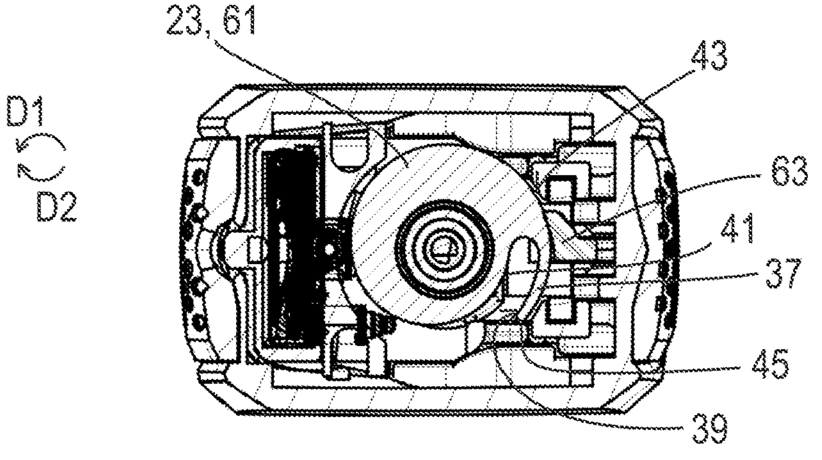
Figure 6A:
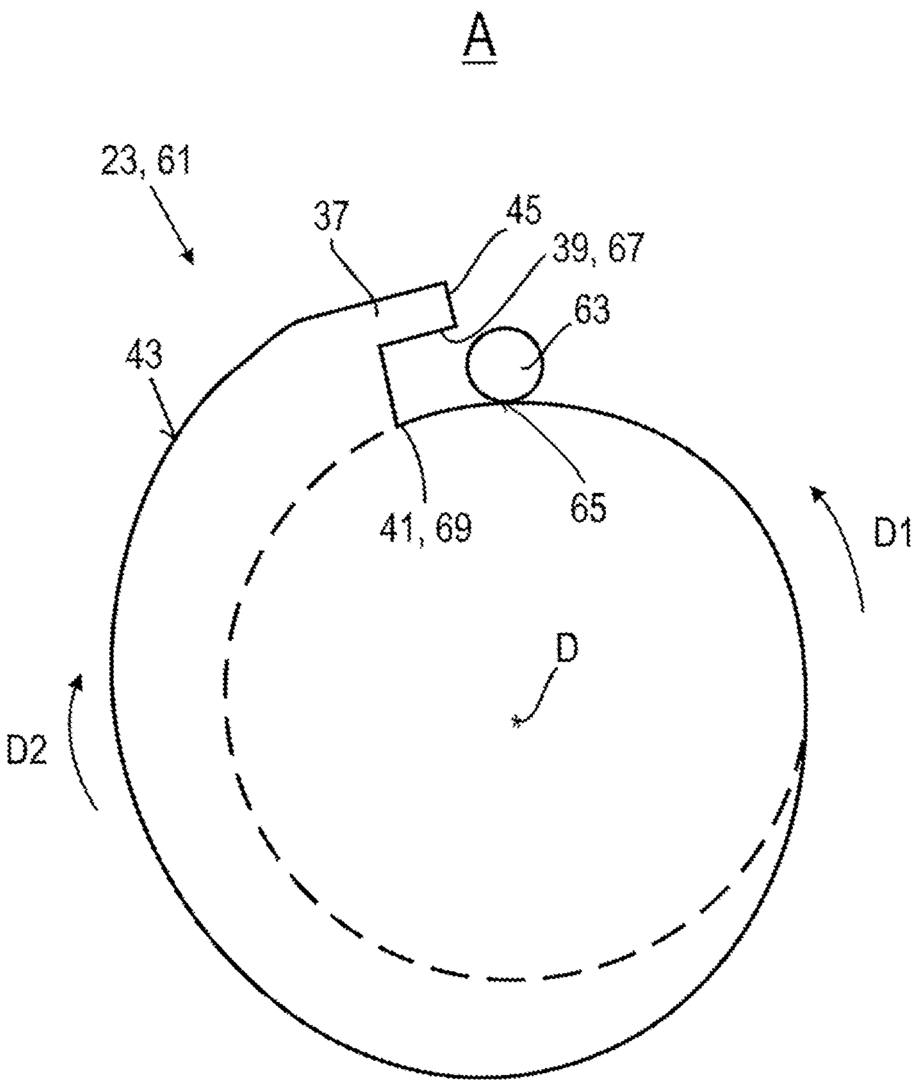
FIGS. 6A to 6C are a schematic representation of the entrainer in the standby position, in the blocking position, or in the release position.

In the release position C, the contact section 63 contacts an angular section of the cam disc 61 at which the cam disc 61 has the greatest extent in the radial direction such that the pivot lever 57 pivots sufficiently far to bring the engagement section 59 out of engagement with the locking surface 86 of the securing part 19 and to bring the latch 21 into the unlocking position E (cf. FIGS. 4A, 4B, and 6A). In the release position C, the pivot lever 57 is in particular pivoted at a maximum about the pivot axis S oriented perpendicular to the axis of rotation D such that, in the release position C, the engagement section 59 of the latch 21 releases a movement path of the securing part 19 from the closed position G into the open position O and the securing part 19' may be moved into the open position O. Because the securing part 19' is preloaded in the direction of the open position O by way of the preload spring 47, the securing part 19' may be moved in the direction of the or into the open position O directly on the reaching of the release position C without a user of the lock 11 himself having to apply a force in the direction of the open position O to the securing part 19'.

To be able to selectively drive the entrainer 23 into the standby position A, the blocking position B, and the release position C, the lock 11 comprises a control circuit 17 that is configured to control the electric motor 25 to perform a corresponding driving of the entrainer 23. The control circuit 17 is in particular connected to a radio module 49 that is configured to receive an unlocking command of a user via a radio connection and to forward it to the control circuit 17, wherein the control circuit 17 is configured to drive the entrainer 23 into the release position C by way of the electric motor 25 in response to the unlocking command (cf. FIGS. 1A, 2A, 3A, and 4A). By way of such a radio module 49, a user may flexibly control and in particular unlock the lock 11 via a mobile radio device, for example a smartphone, wherein the radio module 49 may, for example, be configured to communicate with the mobile radio device via a Bluetooth connection, a mobile radio connection, a WLAN/WiFi connection, and/or an NFC connection. Alternatively or additionally thereto, in such an electromechanical lock 11, an input device may, for example, be provided at an outer side of the housing 79 via which a user may enter a code, for example, a numerical code or a fingerprint. The control circuit 17 may be configured to check whether the code corresponds to the unlocking command and, if an unlocking command was transmitted, to rotate the entrainer 23 into the release position C by way of the electric motor 25.

The lock 11 furthermore has a sensor 51 that is configured to detect the securing part 19' in the closed position G and to transmit a corresponding detection signal to the control circuit 17. For this purpose, the sensor 51 is arranged in a region of the path that describes the securing part 11 during the movement from the open position O into the closed position G such that the sensor 51 may be contacted directly by the securing part 19' during its movement from the open position O into the closed position G (cf. FIGS. 1A, 2A, 3A, and 4A). The control circuit 17 may be configured to drive the electric motor 25 to drive the entrainer 23 into the blocking position B in response to the detection signal, wherein the control circuit 17 may in particular be configured to drive the electric motor 25 to drive the entrainer 23 into the blocking position B in response to the detection signal after a predefined waiting time.

Due to the automatic function already explained, a user may thus move the securing part 19' from the open position O into the closed position G, wherein the securing part 19' is automatically locked by way of the latch 21 snapping back into the locking position V when reaching the closed position G. The detection of the securing part 19 in the closed position G by the sensor 51 further makes it possible to thereupon likewise automatically move the entrainer 23 from the standby position A into the blocking position B such that this additional securing of the latch 21 may also take place automatically and directly as a result of the movement of the securing part 19 from the open position O into the closed position G. To completely and securely lock the securing part 19' to the lock body 13, a user thus only has to move the securing part 19' from the open position O into the closed position G without having to perform any further actions.

The control circuit 17 may further be configured to control the electric motor 25 to drive the entrainer 23 into the standby position A in response to the unlocking command after the driving of the entrainer 23 into the release position C. The control circuit 17 may thus be configured to set the lock 11 into a starting state again after an opening process when the securing part 19' is moved from the closed position G into the open position O, in which starting state the entrainer 23 is arranged in the standby position B and the latch 21 is located in the locking position V, but is released for a movement into the unlocking position E on a movement of the securing part 19 into the closed position G and for an automatic locking of the securing part 19 on the reaching of the closed position G. The automatic rotation of the entrainer 23 from the release position C into the standby position A may also, if necessary, take place after a predefined waiting time to ensure that the securing part 19 has reached the open position O, in particular due to the preload of the preload spring 47, and that the latch 21 is released for a movement into the locking position V.

As can be seen from FIGS. 1A to 4B, the contact section 63 passes a step 45 during the rotation of the entrainer 23 from the release position C into the standby position A, wherein the contact section 63 may, however, automatically come into contact with the control cam 43 again due to the preload of the latch 21 into the locking position V in order, on a subsequent movement of the securing part 19 into the closed position G, to be able to be blocked by the blocking section 37 again by rotating the entrainer 23 into the blocking position B or to be able to be moved into the unlocking position E via the control cam 43 by rotating the entrainer 23 into the release position C. Furthermore, in the embodiment shown, a rotor 53 of the electric motor 25 may likewise be rotated about the axis of rotation D of the entrainer 23 and the electric motor 25 is connected to the entrainer 23 via a gear 55. The gear 55 may in particular be configured as a reduction gear unit to be able to transmit a rotation of the motor 25 slowed down to the entrainer 23 and to be able to accurately drive the entrainer 23. Furthermore, the electric motor 25, the gear 55, and the entrainer 23 are arranged coaxially to one another such that these components of the locking mechanism 15 extend mainly along the axis of rotation D and the installation space occupied by the locking mechanism 15 perpendicular to the axis of rotation D may be minimized (cf. FIGS. 1A, 2A, 3A, and 4A).

FIG. 6A to 6C or 7A to 7C schematically show possible embodiments of the entrainer 23 that may, for example, be used in the brake disc lock 89 illustrated by way of FIGS. 1A to 5B. The entrainer 23 shown in FIGS. 6A to 6C substantially corresponds to the cam disc 61 of the brake disc lock 89 illustrated in FIGS. 1A to 5B.

In FIG. 6A, the entrainer 23 is shown in the standby position A in which a contact section 63 shown as a circle contacts the control cam 43 of the entrainer 23. The entrainer 23 may be rotated by a rotation along a first direction of rotation D1 about the axis of rotation D, which is oriented perpendicular to the drawing plane in the representation, into the release position C in which the contact section 63 contacts an angular section of the entrainer 23 that has the greatest radial extent with respect to the axis of rotation D (cf. FIG. 6C). This makes it possible, as explained above, to move the latch 21 from the locking position V into the unlocking position E by rotating the entrainer 23 into the release position C. The increasing radial extent of the control cam 43 from the standby position A into the release position C can in particular be seen from the comparison with the circle shown dashed inwardly at the entrainer 23.

Figure 6B:
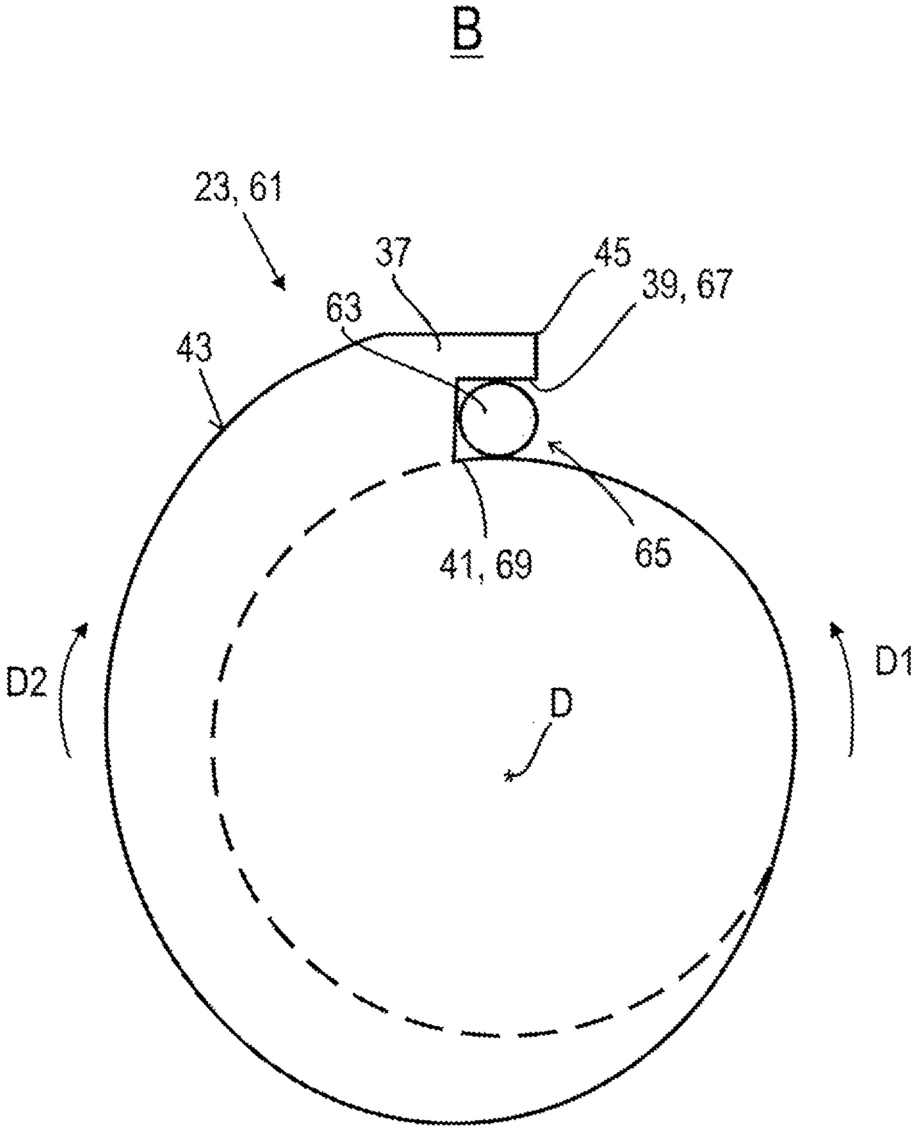

The entrainer 23 may further be moved by a rotation along a second direction of rotation D2, which is opposite the first direction of rotation D1, starting from the standby position A into the blocking position B in which the contact section 63 is arranged in the radial direction with respect to the axis of rotation D between the blocking section 37 and the guiding section 41 such that the blocking section 37 and the guiding section 41 form respective boundaries 67 and 69 of a receiver 65 for the contact section 63 (cf. FIG. 6B). The latch 21 is thereby blocked against a movement into the unlocking position E.

With regard to a possible sequence for which the evaluation circuit 17 may control the entrainer 23 by way of the electric motor 25, the entrainer 23 may first be driven into the standby position A when the securing part 19' is located in the open position O relative to the locking mechanism 15 such that the securing part 19' may be automatically locked by way of the latch 21 on a movement into the closed position G (cf. FIG. 6A). As soon as the securing part 19' has moved into the closed position G and is, for example, detected by way of the sensor 51, the control circuit 17 may cause the entrainer 23 to perform a rotation along the second direction of rotation D2 via the electric motor 25 in order to move the entrainer 23 into the blocking position B and to secure the latch 21 in the locking position V. The entrainer 23 may therefore be transferred from the standby position A shown in FIG. 6A into the blocking position B shown in FIG. 6B. To move the entrainer 23 from the standby position A into the blocking position B, only a slight rotation along the second direction of rotation D2 is required such that the rotation of the entrainer 23 from the standby position A into the blocking position B so-to-say represents a slight correction of the rotational position of the entrainer 23 by which the latch 21 may be secured in the locking position V.

Figure 6C:
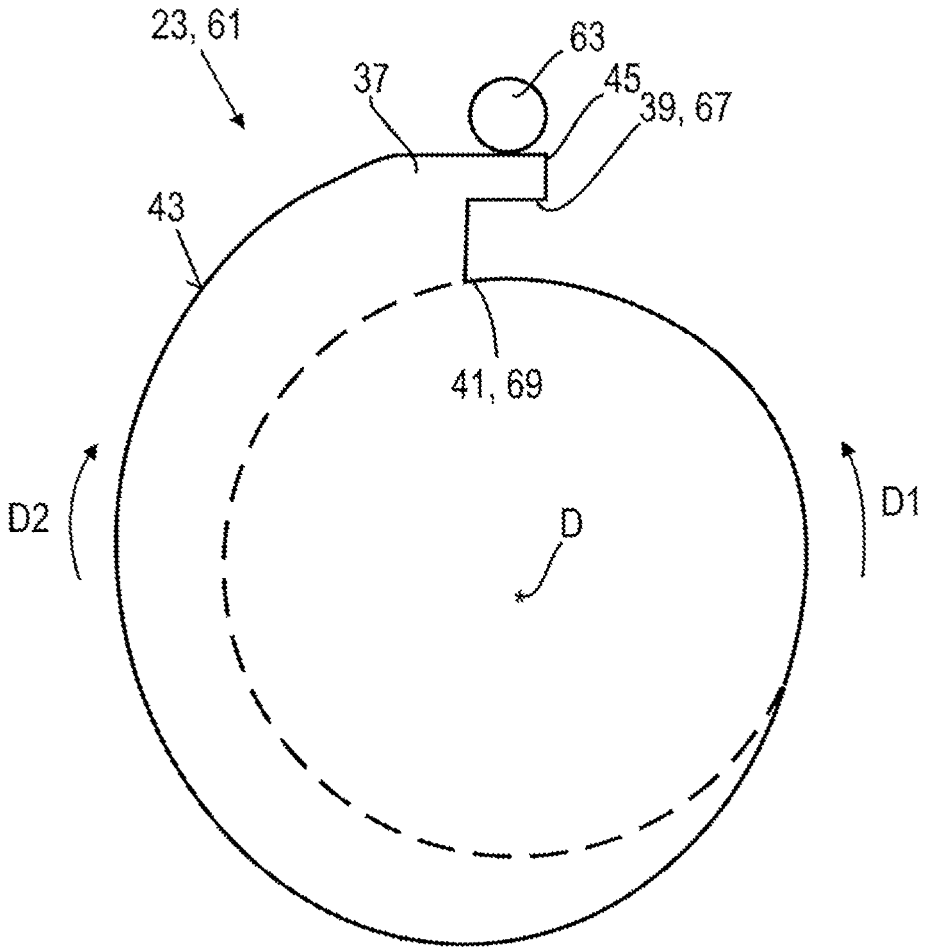

Starting from the blocking position B shown in FIG. 6B and the closed position G of the securing part 19, the control circuit 17 may be configured to control the electric motor 25 to drive the entrainer 23 along the first direction of rotation D1 into the release position C shown in FIG. 6C in response to an unlocking command. This enables a user to move the securing part 19' into the open position O. Possibly after a short waiting time, the control circuit 17 may furthermore be configured to rotate the entrainer 23 from the release position C into the standby position A again (cf. FIG. 6A), for which purpose a slight rotation along the first direction of rotation D1 may take place. In this respect, the contact section 63 passes a step 65, but directly comes into contact with the control cam 43 or an outer margin of the entrainer 23 again due to the preload of the latch 21 into the locking position V.

In the entrainer 23 illustrated by way of FIGS. 6A to 6C, the angular positions of the blocking position B and the release position C correspond to one another with respect to the standby position A, but differ with respect to the direction of rotation D2 or D1. Therefore, starting from the blocking position B, the entrainer 23 may be moved from the blocking position B into the release position C by an easy-to-control rotation about 360° along the first direction of rotation D1. Furthermore, the angles about which the entrainer 23 has to be rotated from the standby position A into the blocking position B and from the release position C into the standby position A correspond to one another, wherein the rotations differ with respect to the direction of rotation D2 or D1. Thus, only two rotations about the same angle, but along opposite directions of rotation D1 and D2, and one complete rotation along the first direction of rotation D1 are ultimately required to control the entrainer 23.

Figure 7A:
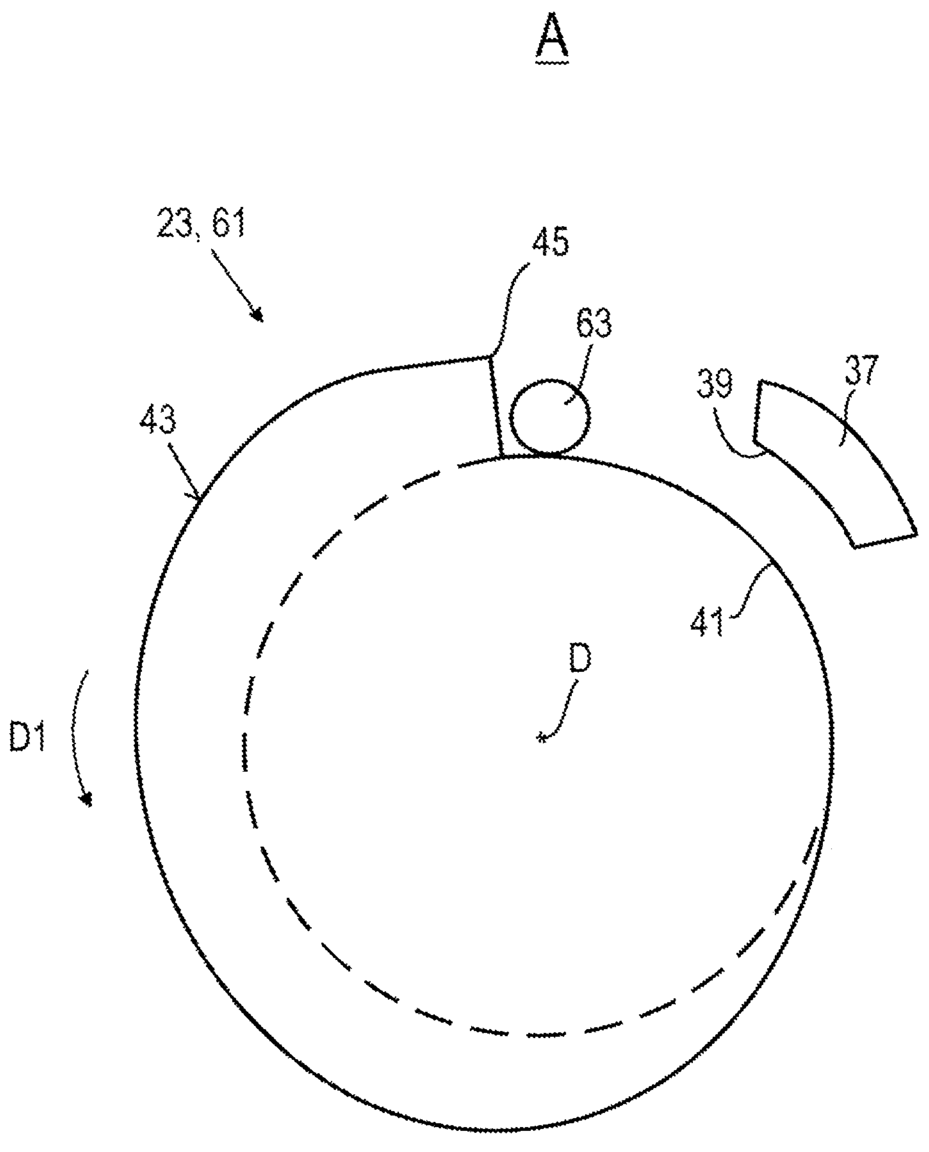
FIGS. 7A to 7C are a schematic representation of a further embodiment of the entrainer in the standby position, in the blocking position, and in the release position.
Figure 7B:
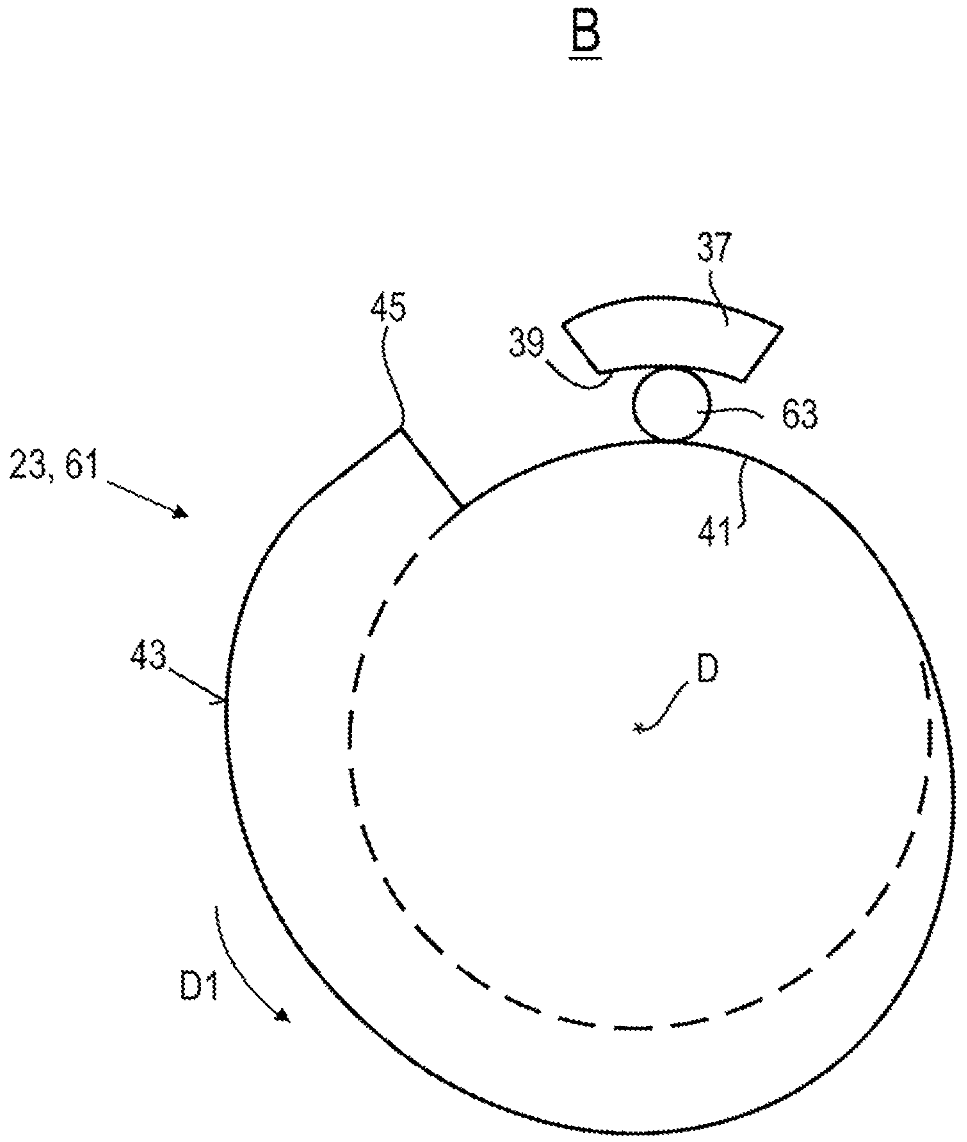
Figure 7C:
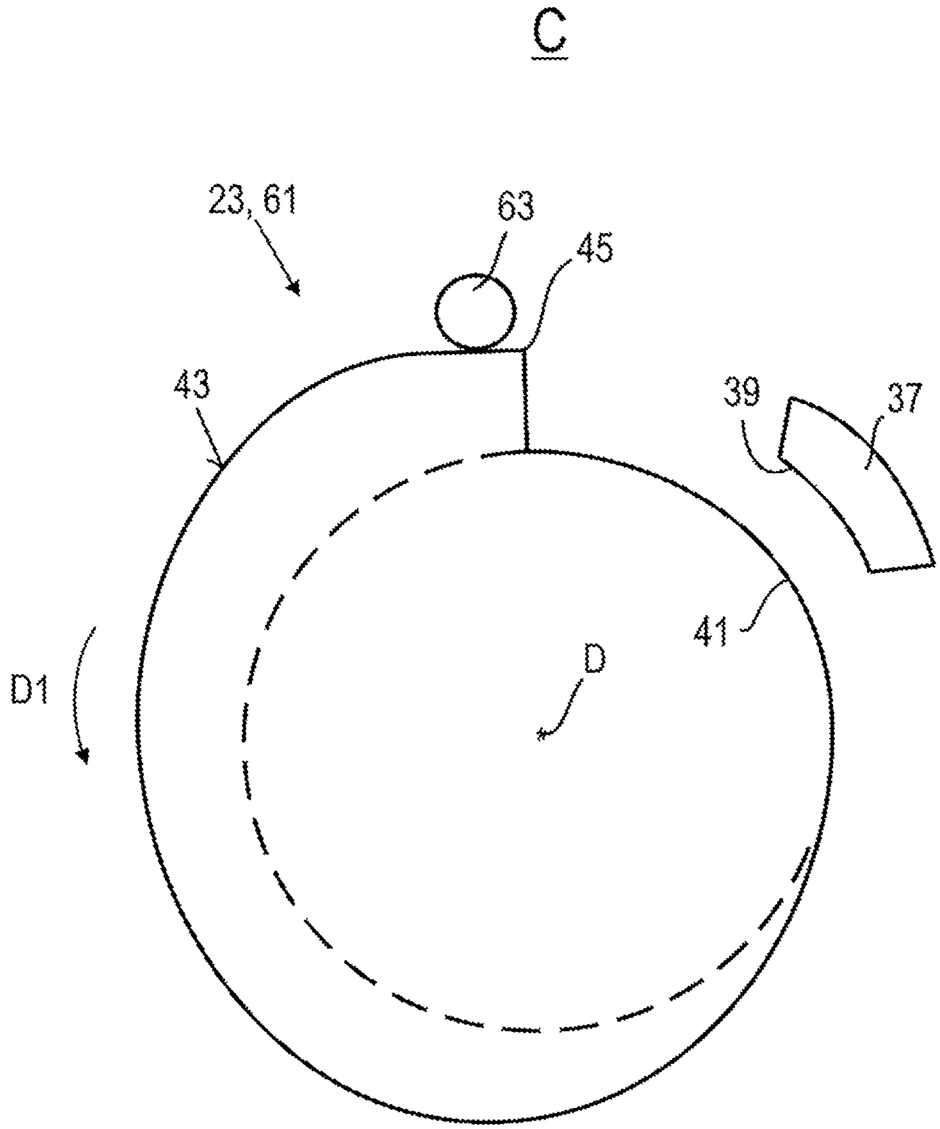

FIGS. 7A to 7C show a further embodiment of the entrainer 23, wherein this entrainer 23 may be transferred starting from the standby position A (cf. FIG. 7A) by a rotation along a single direction of rotation D1 via the blocking position B (cf. FIG. 7B) into the release position C (cf. FIG. 7C). For this purpose, a blocking section 37 is arranged opposite the direction of rotation D1 spaced apart from the section of the entrainer 23 which the contact section 63 contacts in the standby position A such that the contact section 63 of the latch 21 may be brought into alignment with the blocking section 37 by rotating the entrainer 63 along the direction of rotation D1, said blocking section 37 again forming an abutment 39 for the contact section 63 in the blocking position B and thereby blocking the latch 21 in the locking position V. Starting from the blocking position B, the entrainer 23 may then be transferred by a further rotation along the direction of rotation D1 into the release position C in which the contact section 63 again contacts a section of the entrainer 63 that has the greatest radial extent with respect to the axis of rotation D.

The corresponding sequence to guide the entrainer 23, starting from the standby position A, first into the blocking position B and thereupon, in response to an unlocking command, into the release position C and into the standby position A again thus only requires rotations along the direction of rotation D1, unlike in the entrainer 23 illustrated by way of FIGS. 6A to 6C, wherein all the positions of the entrainer 23, starting from the standby position A, may be reached within a single revolution of the entrainer 23. In the entrainer 23 of FIGS. 7A to 7C, the corresponding positions of the entrainer 23 may thus also be intentionally controlled by the control circuit 17, wherein the waiting times already explained above between the movement of the entrainer 23 from the standby position A into the blocking position B and from the release position C into the standby position A may be provided, if necessary.

A locking mechanism 15 of a further embodiment of a lock of the type described herein is shown in FIGS. 8 to 10B, wherein this locking mechanism 15 also has a latch 21 that may be moved between a locking position V and an unlocking position E by way of an entrainer 23 that may be rotated about an axis of rotation D. In contrast to the embodiment illustrated by way of FIGS. 1A to 5B, the latch 21 may, however, be moved linearly along a latch axis R between the locking position V and the unlocking position E, wherein the latch axis R may in particular be oriented perpendicular to a movement which the securing part to be locked performs on a movement from an open position into a closed position.

Figure 8:
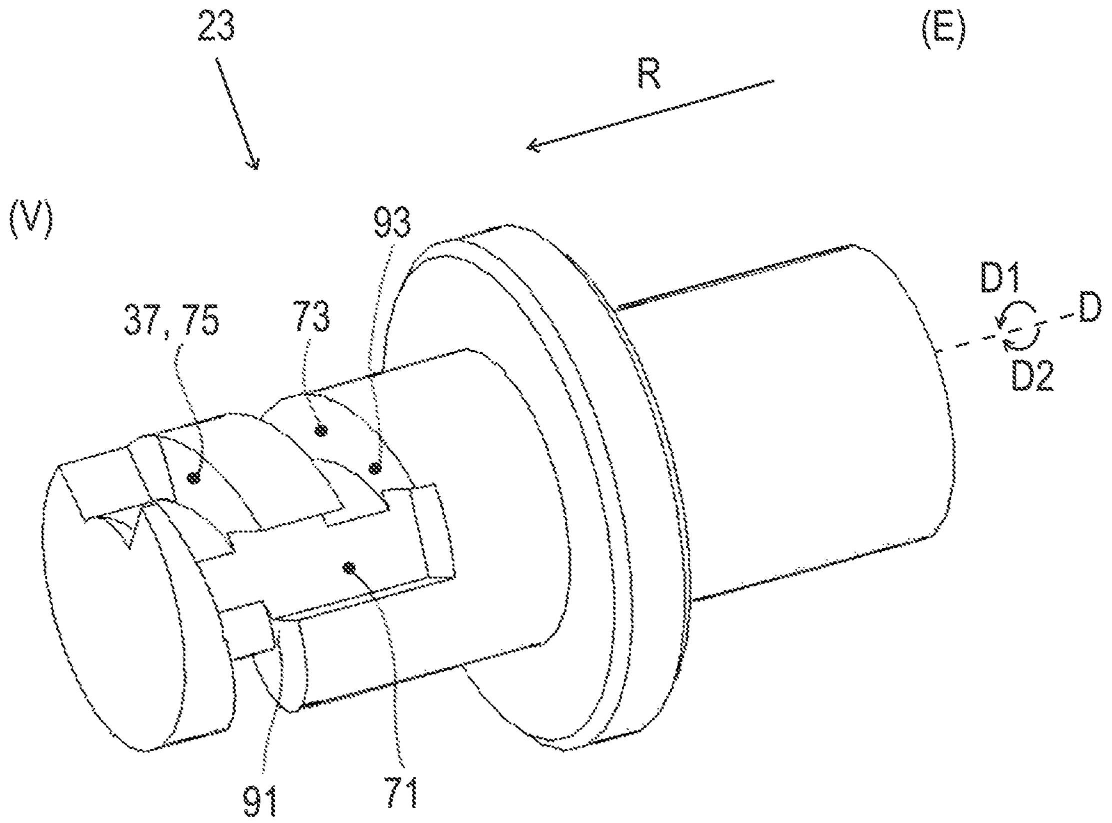
FIG. 8 is a perspective view of an entrainer of a locking mechanism of a further embodiment of the electromechanical lock by way of which a latch may be linearly driven from a locking position into an unlocking position.
Figure 9A:
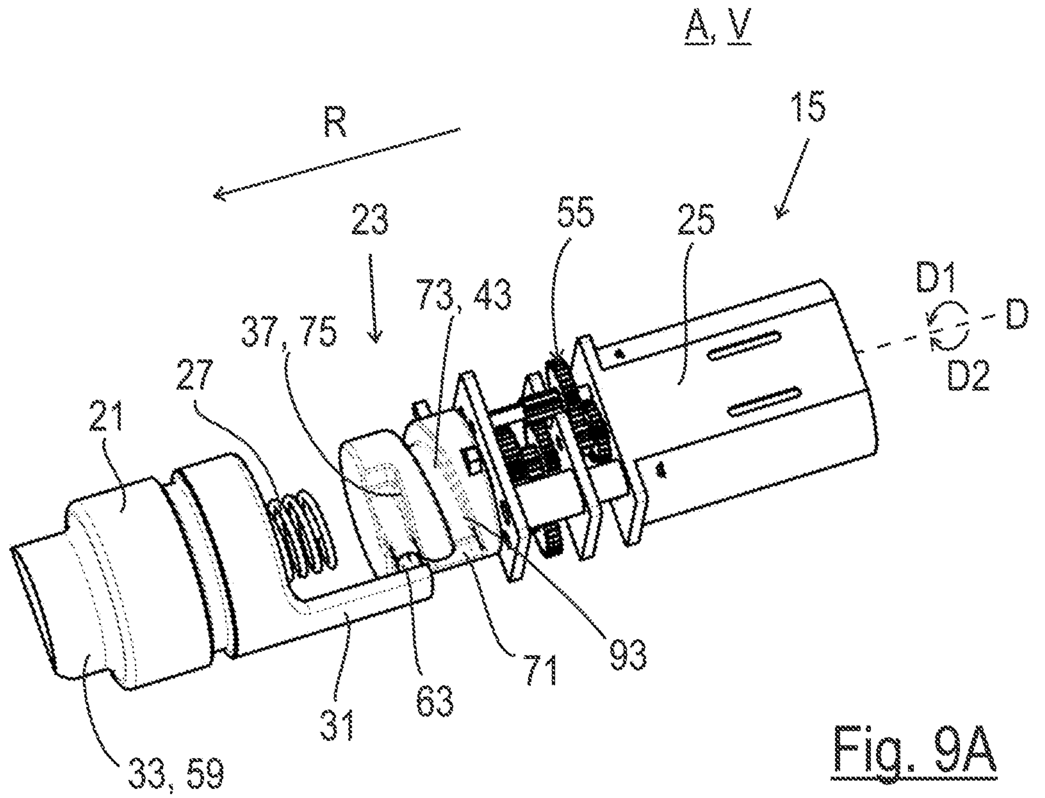
FIG. 9A is a perspective view of a locking mechanism that comprises the entrainer for linearly moving the latch, wherein the entrainer is located in a standby position and the latch is located in the locking position.
Figure 9B:
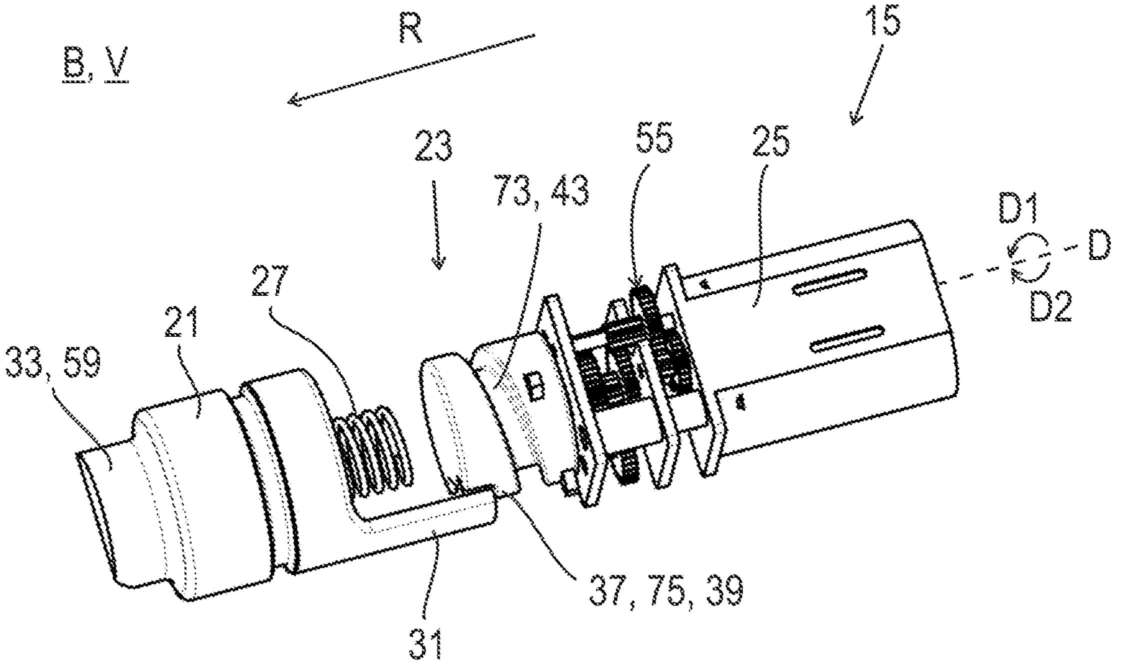
FIG. 9B is a perspective view of the locking mechanism, wherein the entrainer is located in a blocking position and the latch is located in the locking position.
Figure 9C:
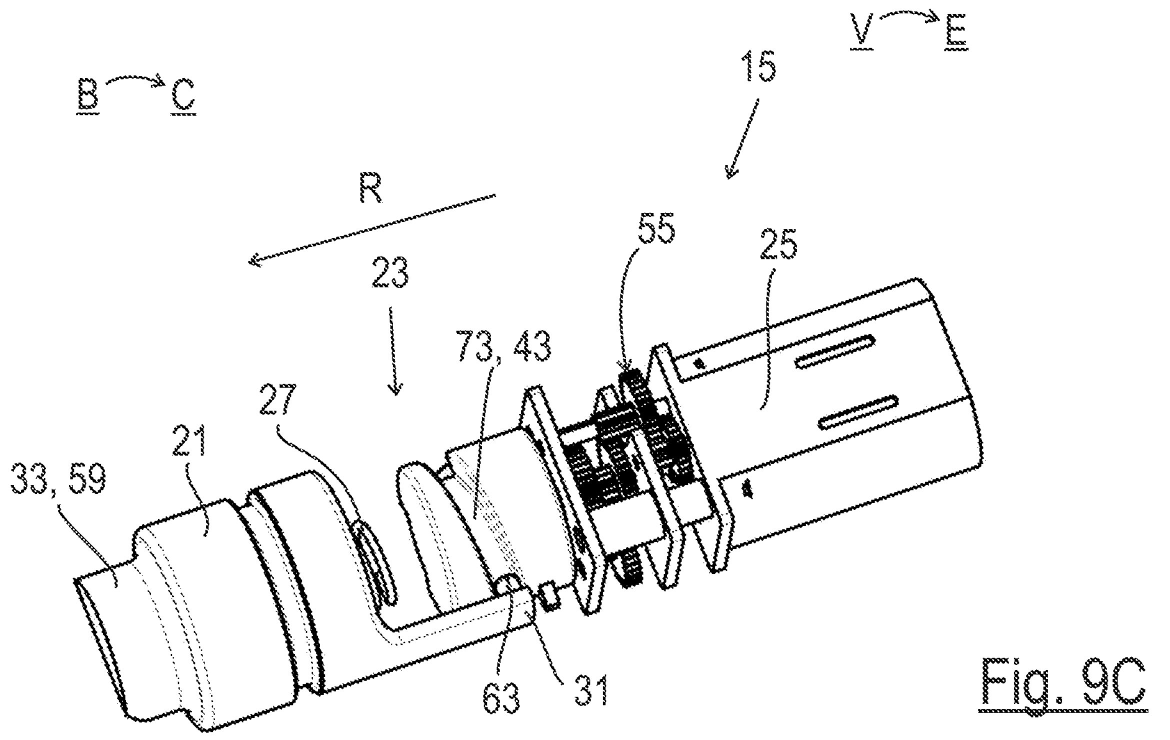
FIG. 9C is a perspective view of the locking mechanism, wherein the entrainer is located between the standby position and a release position and the latch is located between the locking position and the unlocking position.
Figure 9D:
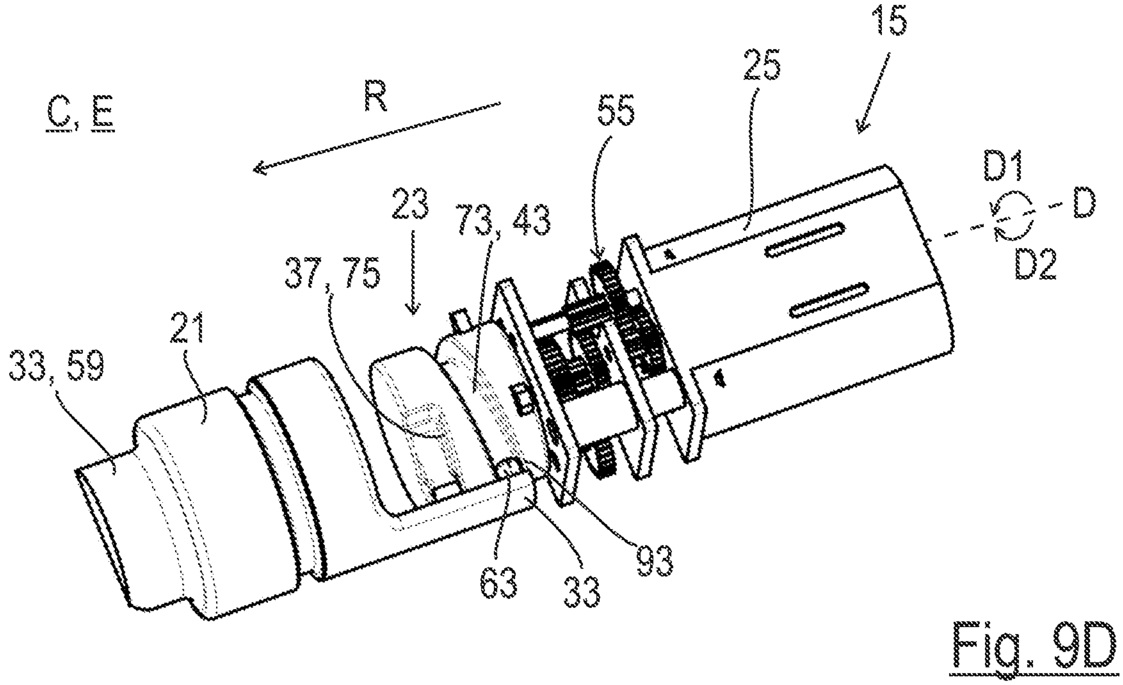
FIG. 9D is a perspective view of the locking mechanism, wherein the entrainer is located in the release position and the latch is located in the unlocking position.

The entrainer 23 of this locking mechanism is shown in FIG. 8 and has a thread 73 in which a contact section 63 of the latch 21 may be guided to move the latch 21 from the locking position V into the unlocking position E (cf. in particular FIGS. 9C and 9D). The entrainer 23 further has a latch passage 71 that extends along the latch axis R and that connects a first end 91 of the thread 73, which faces in the direction of the locking position V of the latch 21, to a second end 93 of the thread 73 that faces in the direction of the unlocking position E (cf. also FIGS. 9A and 9D). As explained in more detail below, this latch passage 71 in particular makes it possible to provide an automatic function for automatically locking a securing part when the securing part is moved from the open position into the closed position. Furthermore, the latch passage 71 separates the thread 73 in the peripheral direction with respect to the axis of rotation D from a blocking section 37 that has a blocking surface 75 oriented perpendicular to the latch axis R. By rotating the entrainer 23 into a blocking position B, this blocking section 37 may be brought into alignment with the contact section 63 of the latch 21 to block the latch 21 in the locking position V (cf. also FIG. 9B).

The driving of the latch 21 between the locking position V and the unlocking position E by way of the locking mechanism 15 and the possibilities for providing an automatic function for automatically locking a securing part in the closed position and for securing the latch 21 in the locking position V can be seen from FIGS. 9A to 9D. The locking mechanism 15 again has an electric motor 25 that is connected to an entrainer 23 via a thread 55, wherein the entrainer 23 may be rotated about an axis of rotation D by way of the electric motor 25. The latch 21 is preloaded by a spring 27 along the latch axis R, which is aligned in parallel with the axis of rotation D, into the locking position V in which the latch 21 may, for example, engage into a movement path of a securing part during its movement from an open position into a closed position.

In FIG. 9A, the entrainer 23 is arranged in a standby position A in which the contact section 63 formed at the latch 21 is arranged in alignment with the latch passage 71 of the entrainer 23 extending along the latch axis R. This makes it possible to move the latch 21 by a movement of a securing part from the open position into the closed position against the preload developed by the spring 27 and against the direction of the latch axis R relative to the entrainer 23 such that the latch 21 may be urged by the securing part into the unlocking position E (cf. also FIGS. 9D and 10B). During this movement, the contact section 63 projecting radially inwardly from the latch 21 with respect to the axis of rotation D is guided in the latch passage 71. When reaching the closed position, the latch 21 may be released by the securing part for a movement into the locking position V and, due to the preload, may snap back into the locking position V when the contact section 63 is guided in the latch passage 71 such that an automatic function for automatically locking the securing part to a lock body may again be provided.

In this latch 21, the contact section 63 is also formed at a drive section 31, wherein an engagement section 59 is formed at a blocking section 33, which is opposite the drive section 31 with respect to the latch axis R, and is configured to enter into engagement with the securing part when the latter is located in the closed position. However, the latch 21 is formed in one part here such that the drive section 31 and the blocking section 33 are formed at a single latch element and are moved together when the latch 21 moves between the locking position V and the unlocking position E.

However, to also be able to secure the linearly movable latch 21 in the locking position V, the entrainer 23 may again be moved into a blocking position B, as shown in FIG. 9B. Starting from the standby position A, the entrainer 23 may for this purpose be rotated along a second direction of rotation D2 about the axis of rotation D by way of the electric motor 25, wherein the contact section 63 of the latch 21 is arranged in alignment with the blocking section 37 of the entrainer 23 by this rotation. This blocking section 37 has the blocking surface 75 that is oriented perpendicular to the latch axis R, that again forms an abutment 39 for the contact section 63, and that thereby blocks a movement of the latch 21 against the latch axis R and in particular into the unlocking position E.

To be able to transfer the latch 21 into the release position C in response to an unlocking command transmitted by the authorized user, the entrainer 23 has the thread 73. As FIG. 9C shows, the contact section 63 may be introduced from the blocking position B via the standby position A into the thread 73 by a rotation of the entrainer 23 along a first direction of rotation D1 opposite the second direction of rotation D2, wherein, due to the engagement of the contact section 63 into the thread 73 and its thread pitch, the latch 21 may be moved against the preload of the spring 27 in the direction of the unlocking position E. The entrainer 23 is thus configured in the manner of a worm and the thread 73 forms a continuous control cam along which the contact section 63 of the latch 21 is guided during the movement of the entrainer 23 from the standby position A into the release position C. The latch 21 may finally reach the unlocking position E when the contact section 63 is arranged in a section of the thread 73 disposed closest to the electric motor 25 and the latch 21 is retracted to a maximum against the latch axis R (cf. FIGS. 9D and 10B).

Because the latch passage 71 further connects the first end 91 of the thread 73 facing in the direction of the locking position V to the second end 93 of the thread 73 facing in the direction of the unlocking position E, the latch passage 71 directly adjoins the thread 73 both in the standby position A and in the release position C (cf. also FIG. 8). Therefore, starting from the release position C, the contact section 63 may be brought into alignment with the latch passage 71 again by a slight further rotation along the first direction of rotation D1 and, due to the preload developed by the spring 27, said contact section 63 may move into the locking position V again. Accordingly, the entrainer 23 also moves into the standby position A again, starting from the release position C, by a slight further rotation along the first direction of rotation D1. Here, too, the angular positions of the entrainer 23 in the blocking position B and in the release position C may correspond to one another such that the entrainer 23 may be movable, starting from the blocking position B, into the release position C by a rotation about 360° along the first direction of rotation D1.

Figure 10A:
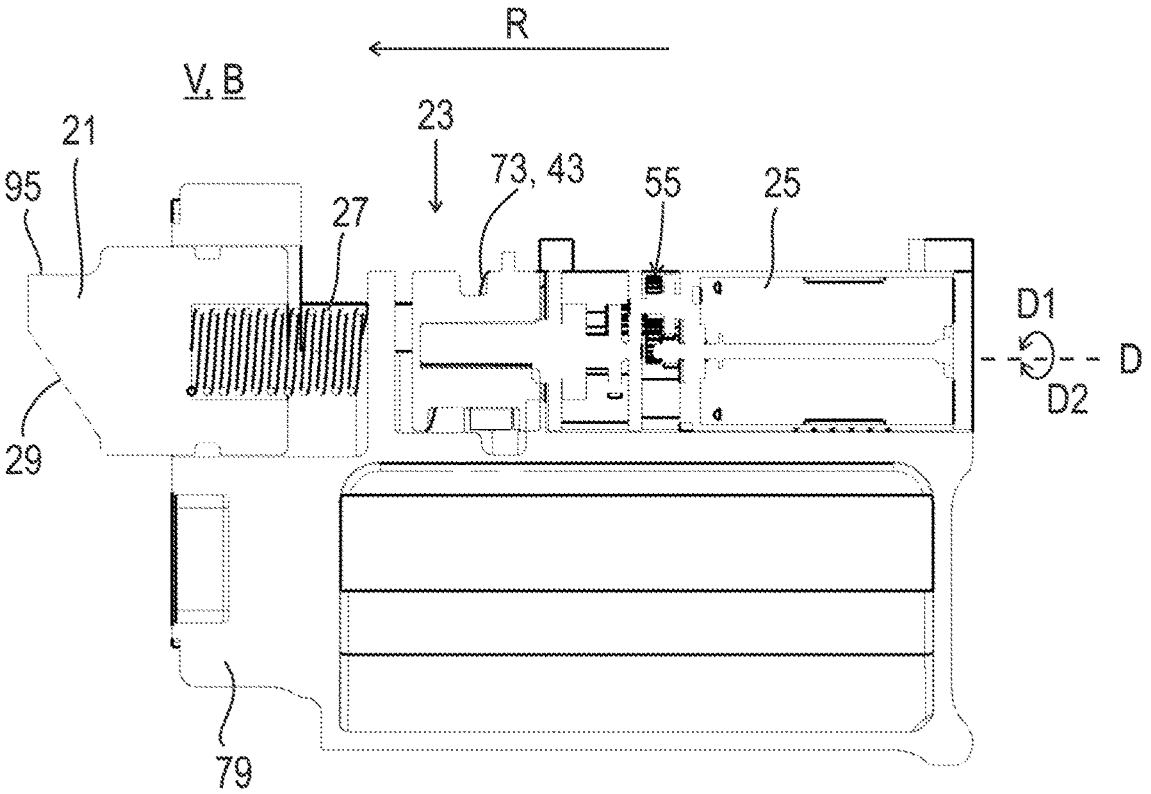
FIGS. 10A and 10B are a respective longitudinal sectional representation of the locking mechanism when the entrainer is located in the blocking position and the latch is located in the locking position or when the entrainer is located in the release position and the latch is located in the unlocking position.
Figure 10B:
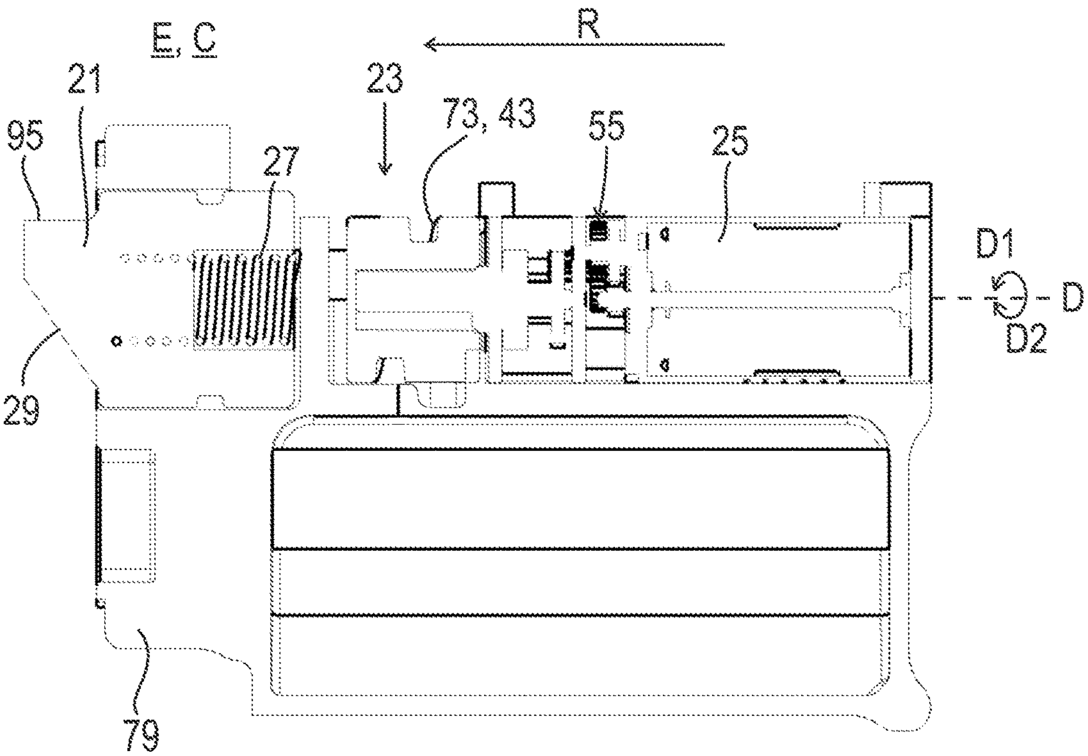

It can again be seen from FIGS. 10A and 10B that the latch 21 may be moved linearly against the latch axis R relative to a housing 79 of a lock by rotating the entrainer 23 from the blocking position B into the release position C to release a securing part for a movement into the open position. Furthermore, the latch 21 has a displacement slope 29 to enable a smooth displacement of the latch 21 into the unlocking position E when the securing part is moved from the open position into the closed position. Furthermore, the latch 21, however, has a blocking surface 95 that is oriented along the latch axis R and that may therefore in particular be oriented perpendicular to a movement of the securing part from the closed position into the open position. This blocking surface 95 may, for example, cooperate with a blocking surface of a notch of a securing part aligned in parallel therewith in order to be able to reliably block the securing part against a movement into the open position.

For example, the locking mechanism 15 comprising the linearly movable latch 21 may thus be used to lock a locking bolt to a lock body as shown in DE 196 39 235 A1. Because the latch axis R may in particular be oriented perpendicular to a movement which the securing part to be locked performs on a movement from an open position into a closed position, the locking mechanism 15 illustrated by way of FIGS. 8 to 10B may in particular also be used for a deployment in a joint lock or a folding lock, for example a joint lock of the type shown in DE 10 2019 123 481 A1.

The locking mechanism 15 illustrated by way of FIGS. 8 to 10B thus represents a possibility of providing an automatic function with a linearly displaceable latch 21 and of securing the latch 21 in the locking position V. In this regard, the locking mechanism 15 may in principle be controlled by way of a control circuit as explained above in particular with reference to FIGS. 6A and 6B in order to selectively lock a securing part 19', which is movable between an open position O and a closed position G, to a lock body 13 or to release it for a movement from the closed position G into the open position O. In general, provision may, however, also be made that the blocking section 37 is formed as part of the thread 73 in such an entrainer 23 such that only rotations along the first direction of rotation D1 may take place when the entrainer 23 is moved between the standby position A, the blocking position B, and the release position C. This enables a control similar to the sequence explained with reference to FIGS. 7A and 7B.

REFERENCE NUMERAL LIST

11 electromechanical lock
13 lock body
15 locking mechanism
17 control circuit
19 counter-piece
19 securing part
21 latch
23 entrainer
25 electric motor
27 spring
29 displacement slope
31 drive section
33 blocking section
35 latch element
36 latch element
37 blocking section
39 abutment
41 guiding section
43 control cam
45 step
47 preload spring
49 radio module
51 sensor
53 rotor of the electric motor
55 gear
57 pivot lever
59 engagement section
61 cam disc
63 contact section
65 receiver
67 first boundary of the receiver
69 second boundary of the receiver
71 latch passage
73 thread
75 blocking surface
77 reception gap
79 housing
81 securing section
83 connection section
85 housing section
86 locking surface
87 locking section
89 brake disc lock
91 first end of the thread
93 second end of the thread
95 blocking surface of the latch
A standby position
B blocking position
C release position
D axis of rotation
D1 first direction of rotation D2 second direction of rotation
E unlocking position
G closed position
O open position
R latch axis
S pivot axis
V locking position

What is claimed is:

1. An electromechanical lock, comprising:

an electromechanical locking mechanism for locking an associated counter-piece that adopts an open position or a closed position relative to the locking mechanism; and a control circuit, wherein the electromechanical locking mechanism has a latch, an entrainer that is rotatable about an axis of rotation for driving the latch, and an electric motor for driving the entrainer, wherein the latch is moveable between a locking position, in which the latch locks the associated counter-piece located in the closed position, and an unlocking position, in which the latch releases the associated counter-piece for the open position, wherein the latch is preloaded in the direction of the locking position, wherein the entrainer is selectively rotatable into a release position, a standby position, and a blocking position by way of the electric motor, wherein, by rotating the entrainer into the release position, the latch is driven by way of the entrainer to perform a movement from the locking position into the unlocking position, wherein, in the standby position of the entrainer, the latch is released to be urged back against the preload from the locking position, and wherein, in the blocking position of the entrainer, the entrainer blocks the latch against a movement from the locking position in the direction of the unlocking position, wherein the control circuit controls the electric motor to drive the entrainer into the release position, the standby position, and the blocking position, wherein the entrainer forms a continuous control cam between an angular section which a contact section of the latch contacts in the standby position of the entrainer and an angular section which the contact section of the latch contacts in the release position of the entrainer, wherein the angular section of the entrainer that the contact section of the latch contacts in the release position has a greater radial extent than the angular section of the entrainer that the contact section of the latch contacts in the standby position.

2. The electromechanical lock of claim 1, wherein the latch has a drive section that is impacted by the entrainer in order to drive the latch into the unlocking position, and wherein the latch has a blocking section that locks the associated counter-piece, which is located in the closed position, in the locking position of the latch, wherein the drive section and the blocking section are formed at a common latch element or as separate latch elements.

3. The electromechanical lock of claim 1, wherein, in the standby position of the entrainer, the latch is released to first be urged back from the locking position by way of the associated counter-piece when the latter is brought from the open position into the closed position, and then to snap back into the locking position as a result of the preload.

4. The electromechanical lock of claim 1, wherein the entrainer has a blocking section that forms an abutment for the latch in the blocking position.

5. The electromechanical lock of claim 4, wherein the entrainer has a guiding section which is opposite the blocking section and which the latch contacts in the blocking position.

6. The electromechanical lock of claim 1, wherein the entrainer, starting from the standby position, is transferred into the standby position again by a complete rotation about the axis of rotation.

7. The electromechanical lock of claim 1, wherein the entrainer is rotatable along a first direction of rotation from the standby position into the release position, and wherein the entrainer is rotatable along a second direction of rotation from the standby position into the blocking position, wherein the second direction of rotation is opposite the first direction of rotation.

8. The electromechanical lock of claim 1, wherein the entrainer is rotatable starting from the standby position via the blocking position into the release position.

9. The electromechanical lock of claim 1, wherein the lock has a sensor that detects the associated counter-piece in the closed position and outputs a corresponding detection signal, wherein the control circuit controls the electric motor to drive the entrainer into the blocking position in response to the detection signal.

10. The electromechanical lock of claim 9, wherein the control circuit controls the electric motor to drive the entrainer into the blocking position in response to the detection signal after a predefined waiting time.

11. The electromechanical lock of claim 1, wherein the control circuit controls the electric motor to drive the entrainer into the release position in response to an unlocking command, wherein the control circuit controls the electric motor to drive the entrainer into the standby position in response to the unlocking command after a predefined waiting time.

12. The electromechanical lock of claim 1, wherein the latch has a pivot lever pivotable about a pivot axis and an engagement section that is fastened to the pivot lever and that locks the associated counter-piece, which is located in the closed position, in the locking position of the latch, wherein the latch is moveable by a pivot movement of the pivot lever about the pivot axis from the locking position into the unlocking position.

13. The electromechanical lock of claim 12, wherein the entrainer is a cam disc which the pivot lever contacts, wherein the pivot lever is driven to perform the pivot movement by rotating the entrainer into the release position.

14. The electromechanical lock of claim 12, wherein the pivot lever has a contact section, and wherein the entrainer has a blocking section, wherein the blocking section engages behind the contact section in the blocking position and blocks the pivot movement of the pivot lever by the engagement behind.

15. The electromechanical lock of claim 1, wherein the lock has a lock body and the associated counter-piece, wherein the lock body includes the locking mechanism, wherein the counter-piece forms a securing part that is moveable relative to the lock body between the open position and the closed position, wherein the latch locks the securing part, which is located in the closed position, to the lock body in the locking position and releases the securing part in the unlocking position for a movement into the open position.

16. An electromechanical lock, comprising:

an electromechanical locking mechanism for locking an associated counter-piece that adopts an open position or a closed position relative to the locking mechanism; and a control circuit, wherein the electromechanical locking mechanism has a latch, an entrainer that is rotatable about an axis of rotation for driving the latch, and an electric motor for driving the entrainer, wherein the latch is moveable between a locking position, in which the latch locks the associated counter-piece located in the closed position, and an unlocking position, in which the latch releases the associated counter-piece for the open position, wherein the latch is preloaded in the direction of the locking position, wherein the entrainer is selectively rotatable into a release position, a standby position, and a blocking position by way of the electric motor, wherein, by rotating the entrainer into the release position, the latch is driven by way of the entrainer to perform a movement from the locking position into the unlocking position, wherein, in the standby position of the entrainer, the latch is released to be urged back against the preload from the locking position, and wherein, in the blocking position of the entrainer, the entrainer blocks the latch against a movement from the locking position in the direction of the unlocking position, wherein the control circuit controls the electric motor to drive the entrainer into the release position, the standby position, and the blocking position, wherein the release position and the blocking position correspond to the same angular position of the entrainer and differ from one another with respect to the direction of rotation in which the entrainer is rotated, starting from the standby position, in order to set either the release position or the blocking position.

17. An electromechanical lock, comprising:

an electromechanical locking mechanism for locking an associated counter-piece that adopts an open position or a closed position relative to the locking mechanism; and a control circuit, wherein the electromechanical locking mechanism has a latch, an entrainer that is rotatable about an axis of rotation for driving the latch, and an electric motor for driving the entrainer, wherein the latch is moveable between a locking position, in which the latch locks the associated counter-piece located in the closed position, and an unlocking position, in which the latch releases the associated counter-piece for the open position, wherein the latch is preloaded in the direction of the locking position, wherein the entrainer is selectively rotatable into a release position, a standby position, and a blocking position by way of the electric motor, wherein, by rotating the entrainer into the release position, the latch is driven by way of the entrainer to perform a movement from the locking position into the unlocking position, wherein, in the standby position of the entrainer, the latch is released to be urged back against the preload from the locking position, and wherein, in the blocking position of the entrainer, the entrainer blocks the latch against a movement from the locking position in the direction of the unlocking position, wherein the control circuit controls the electric motor to drive the entrainer into the release position, the standby position, and the blocking position, wherein the latch has a pivot lever pivotable about a pivot axis and an engagement section that is fastened to the pivot lever and that locks the associated counter-piece, which is located in the closed position, in the locking position of the latch, wherein the latch is moveable by a pivot movement of the pivot lever about the pivot axis from the locking position into the unlocking position, wherein the pivot lever has a contact section, and wherein the entrainer has a blocking section, wherein the blocking section engages behind the contact section in the blocking position and blocks the pivot movement of the pivot lever by the engagement behind, wherein, in the blocking position, the entrainer has a receiver for the contact section that is bounded at least at three sides, wherein the blocking section forms a first boundary of the receiver, and wherein a second boundary of the receiver that is opposite the first boundary is formed by a guiding section which the contact section contacts, wherein the guiding section is connected to the blocking section by a third boundary of the receiver.

* * * * *